(12) United States Patent
Kawachi et al.

(10) Patent No.: US 7,151,568 B2
(45) Date of Patent: Dec. 19, 2006

(54) DISPLACEMENT SENSOR

(75) Inventors: Masahiro Kawachi, Kyoto (JP); Michitoshi Okada, Kyoto (JP); Koji Shimada, Kyoto (JP); Hitoshi Oba, Kyoto (JP); Satoshi Yoneda, Kyoto (JP)

(73) Assignee: Omron Corporation, Kyoto (JP)

( * ) Notice: Subject to any disclaimer, the term of this patent is extended or adjusted under 35 U.S.C. 154(b) by 823 days.

(21) Appl. No.: 09/979,007

(22) PCT Filed: Mar. 15, 2001

(86) PCT No.: PCT/JP01/02038

§ 371 (c)(1),
(2), (4) Date: Nov. 14, 2001

(87) PCT Pub. No.: WO01/69169

PCT Pub. Date: Sep. 20, 2001

(65) Prior Publication Data

US 2002/0159074 A1 Oct. 31, 2002

(30) Foreign Application Priority Data

Mar. 15, 2000 (JP) .............................. 2000-072762
Mar. 31, 2000 (JP) .............................. 2000-096816
Mar. 31, 2000 (JP) .............................. 2000-136414

(51) Int. Cl.
*H04N 5/217* (2006.01)
*H04N 9/64* (2006.01)
*H04N 7/12* (2006.01)

(52) U.S. Cl. ..................... 348/302; 348/245; 348/241; 375/240.26

(58) Field of Classification Search ................ 348/241, 348/243, 245, 607, 222.1, 240.2, 303, 304, 348/315, 302; 375/240.26
See application file for complete search history.

(56) References Cited

U.S. PATENT DOCUMENTS 4,910,599 A * 3/1990 Hashimoto ................ 348/240.2

(Continued)

FOREIGN PATENT DOCUMENTS

EP 0330100 8/1989

(Continued)

OTHER PUBLICATIONS

Rudie Spooren, "Standard charge-coupled device cameras for video speckle interferometry," (Mar. 1994) *Optical Engineering*, vol. 33 No. 3, pp. 889-896.

*Primary Examiner*—Lin Ye
(74) *Attorney, Agent, or Firm*—Foley & Lardner LLP

(57) ABSTRACT

A displacement sensor comprising an imaging unit and an image processing unit. The imaging unit comprises a two dimensional imaging device and a drive control unit. The two dimensional imaging device includes a group of light receiving pixels arranged in a matrix so as to correspond to a field of view of a standard imaging unit, a plurality of vertical shift registers corresponding to different columns of the pixels, and a horizontal register for receiving the outputs of the vertical shift registers from top stages thereof, a photosensitive pixel region being defined in a prescribed horizontal band having a sufficiently narrower width than that would be provided by the total number of horizontal lines and interposed between a front optically black pixel region and a back optically black pixel region. The drive control unit controls, according to a commanded electric charge transfer protocol, a feeding of signal electric charges from each light receiving pixel to the vertical shift register of a corresponding column, a vertical transfer of signal electric charges in the vertical shift register of each column, and a horizontal transfer of signal electric charges in the horizontal shift register. The image processing unit comprises electric charge transfer protocol command means for giving an electric charge transfer protocol to the drive control unit of the imaging unit in dependence of a content of the image process.

26 Claims, 32 Drawing Sheets

A schematic view showing the pixel arrangement on the light receiving surface of the imaging device used in the imaging unit of the present invention

U.S. PATENT DOCUMENTS

| | | | |
|---|---|---|---|
| 5,196,939 A * | 3/1993 | Elabd et al. | 348/314 |
| 5,489,945 A * | 2/1996 | Kannegundla et al. | 348/521 |
| 6,323,900 B1 * | 11/2001 | Kobayashi | 348/241 |
| 6,686,960 B1 * | 2/2004 | Iizuka | 348/273 |
| 6,824,058 B1 * | 11/2004 | Patel et al. | 235/462.2 |

FOREIGN PATENT DOCUMENTS

| | | |
|---|---|---|
| EP | 0633691 | 1/1995 |
| JP | 62-261910 | 11/1987 |
| JP | 2-32281 | 2/1990 |
| JP | 02-32281 | 2/1990 |
| JP | 05-219446 | 8/1993 |
| JP | 09-005048 | 1/1997 |
| JP | 10-145679 | 5/1998 |
| JP | 2000-13686 | 1/2000 |

* cited by examiner

A block diagram showing the electric hardware structure of a displacement sensor embodying the present invention A diagram showing the optical system of the sensor head unit of the displacement sensor of the present invention A schematic view showing the pixel arrangement on the light receiving surface of the imaging device used in the imaging unit of the present invention A diagram showing the relationship between the photosensitive pixel region and optically black pixel region of the imaging device used in the imaging unit of the present invention in an actual aspect ratio A diagram showing the internal structure of the transfer pulse generating unit A time chart showing the output mode of the transfer pulse (TP2)

Fig.8

| horizontal interval counter value | L2 | L1 | OE |
|---|---|---|---|
| 1 | 1 | 1 | 0 |
| 2 | 1 | 0 | 1 |
| ⋮ | ⋮ | ⋮ | ⋮ |
| 31 | 1 | 0 | 1 |

A diagram showing the structure of the transfer protocol table
(first method for reading an image at high speed)

Fig. 9

| L1 | L2 | transfer line number |
|---|---|---|
| 0 | 0 | 1 |
| 1 | 0 | 2 |
| 0 | 1 | 4 |
| 1 | 1 | 7 |

(a) relationship between the states of L1 and L2 and the transfer line number

| OE | TP3 output |
|---|---|
| 0 | no |
| 1 | yes |

(b) relationship between the state of OE and the TP3 output

A diagram showing the contents of L1, L2 and OE

A flow chart showing the operation of the transfer control unit

A time chart showing the drive mode of the imaging device (first method for reading an image at high speed)

A view showing a part of the time chart of Figure 11

A view showing a part of the time chart of Figure 11

*Fig.14*

| output line number | contents | |
|---|---|---|
| 1 | empty (no output) | } ineffective image |
| 2 | sum of 9 horizontal lines 1 to 9 | |
| 3 | sum of 2 horizontal lines 10 and 11 | } effective image |
| ⋮ | ⋮ | |
| 31 | sum of 2 horizontal lines 66 and 67 | |

A table showing the data structure of a single frame
in the exemplary drive mode of the imaging device of the present invention
(first method of reading an image at high speed)

Fig.15

| horizontal interval counter value | L2 | L1 | OE |
|---|---|---|---|
| 1 | 1 | 1 | 0 |
| 2 | 1 | 0 | 1 |
| ⋮ | ⋮ | ⋮ | ⋮ |
| 31 | 1 | 0 | 1 |
| 32 | 1 | 1 | 0 |
| ⋮ | ⋮ | ⋮ | ⋮ |
| 134 | 1 | 1 | 0 |

A diagram showing the structure of the transfer protocol table (second method for reading an image at high speed)

A time chart showing the drive mode of the imaging device (second method for reading an image at high speed)

Fig.17

| output line number | contents |
|---|---|
| 1 | empty (no output) |
| 2 | sum of 730 horizontal lines 68 to 788 and 1 to 9 |
| 3 | sum of 2 horizontal lines 10 and 11 |
| ⋮ | ⋮ |
| 31 | sum of 2 horizontal lines 66 and 67 |
| 32 | empty (no output) |
| ⋮ | ⋮ |
| 134 | empty (no output) |

Lines 1–2: front ineffective image
Lines 3–31: effective image
Lines 32–134: back ineffective image A table showing the data structure of a single frame in the exemplary drive mode of the imaging device of the present invention (second method of reading an image at high speed)

Add all the lines, and read them as single line

A schematic diagram illustrating the entire line comprehensive averaging process which is performed in the imaging device

*Fig.19*

| horizontal interval counter value | L2 | L1 | OE |
|---|---|---|---|
| 1 | 1 | 1 | 0 |
| 2 | 1 | 0 | 0 |
| ⋮ | ⋮ | ⋮ | ⋮ |
| 31 | 1 | 0 | 1 |

A diagram showing the contents of the transfer protocol table for the entire line comprehensive averaging process

Fig.21

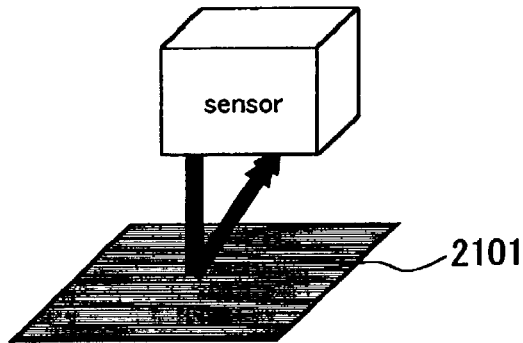

(a) relationship between an object having hairlines on its surface and the sensor head unit

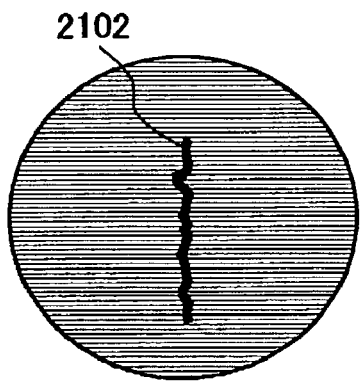

(b) line beam appearing on the surface of the object influences of hairlines are reduced by averaging owing to the area effect

(c) line beam image on the light receiving surface of the imaging device

A view showing an exemplary application of the entire line comprehensive averaging process A flowchart showing the overall image processing that is performed in the sensor main unit

Fig. 23

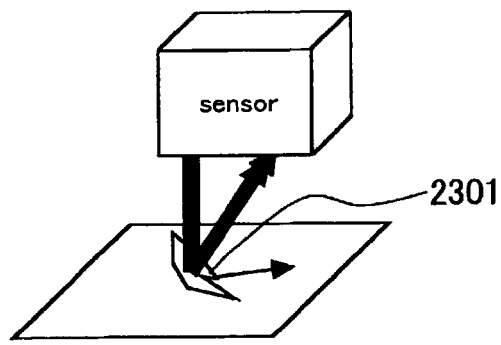

(a) relationship between an object having a flaw on its surface and the sensor head unit

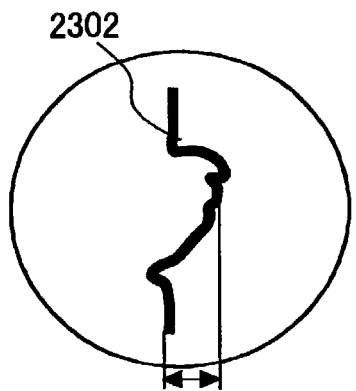

compute the height of each measurement line and obtain P-P or obtain the variance of the heights of measurement lines (b) line beam appearing on the surface of the object

(c) line beam image on the light receiving surface of the imaging device

A diagram showing the image process for measuring a flaw

*Fig.24*
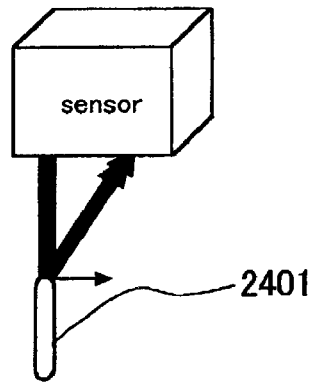
(a) relationship between an object having a projection on its surface and the sensor head unit
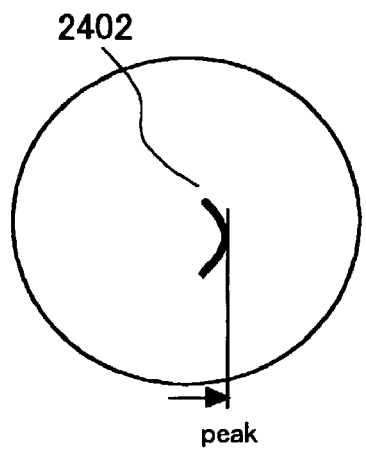
(b) line beam appearing on the surface of the object
(c) line beam image on the light receiving surface of the imaging device
A diagram showing the image process for measuring a projection Fig.25
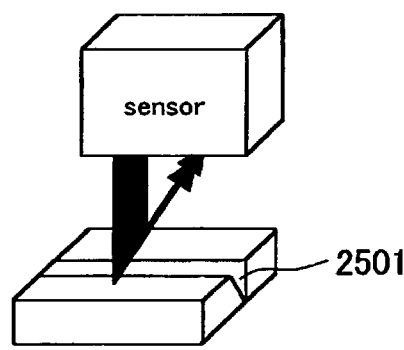
(a) relationship between an object having a groove on its surface and the sensor head unit
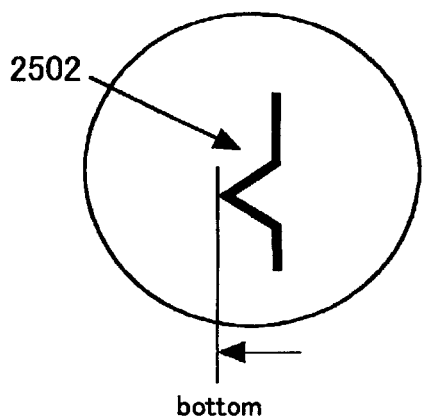
(b) line beam appearing on the surface of the object
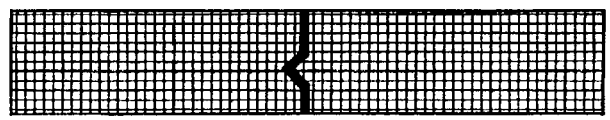
(c) line beam image on the light receiving surface of the imaging device
A diagram showing the image process for measuring a groove

*Fig.26*
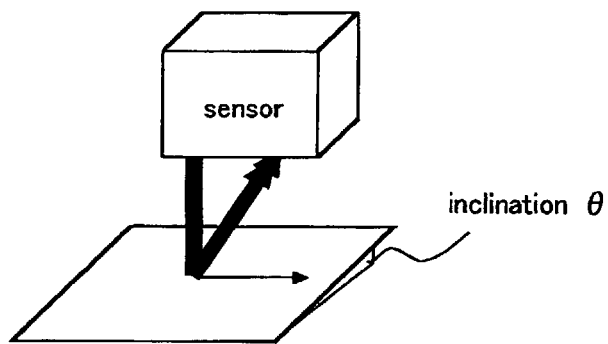
(a) relationship between an object having an inclination on its surface and the sensor head unit
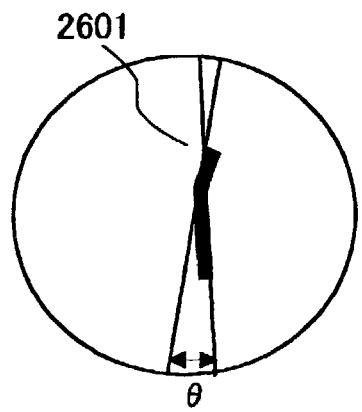
(b) line beam appearing on the surface of the object
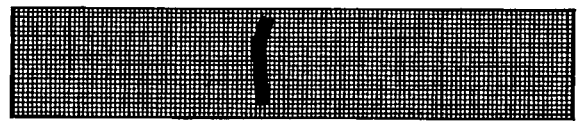
(c) line beam image on the light receiving surface of the imaging device
A diagram showing the image process for measuring an inclination

*Fig.27*
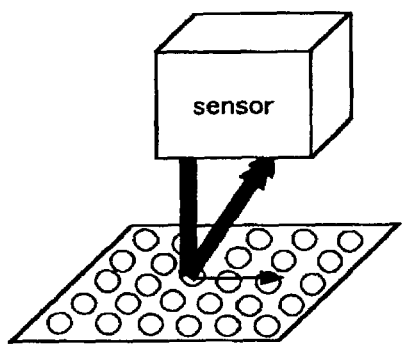
(a) relationship between an object having a BGA on its surface and the sensor head unit
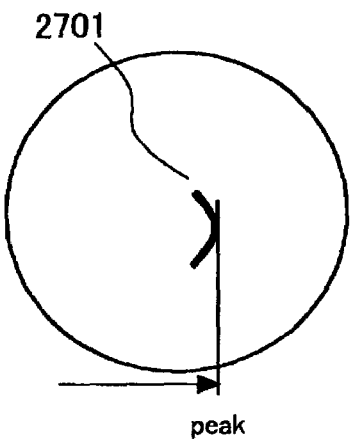
(b) line beam appearing on the surface of the object
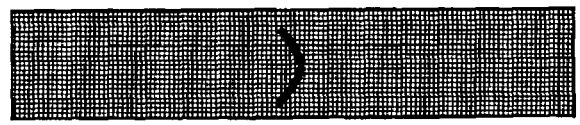
(c) line beam image on the light receiving surface of the imaging device
A diagram showing the image process for measuring a coplanarity A schematic diagram showing the mode
of measuring a region using the conventional sensor A diagram showing the photosensitive pixel region
of a conventional two dimensional CCD

*Fig.31*
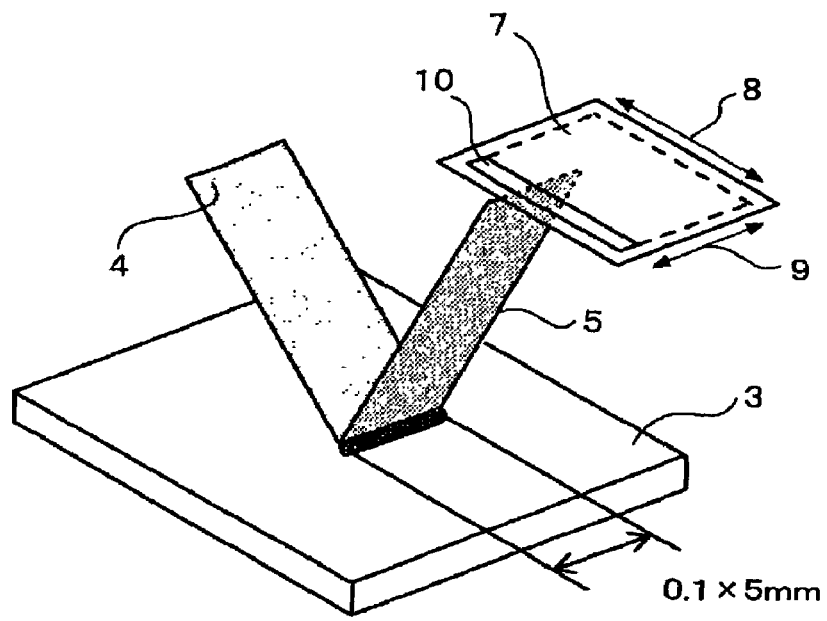
(a) A schematic perspective view of the displacement sensor head unit
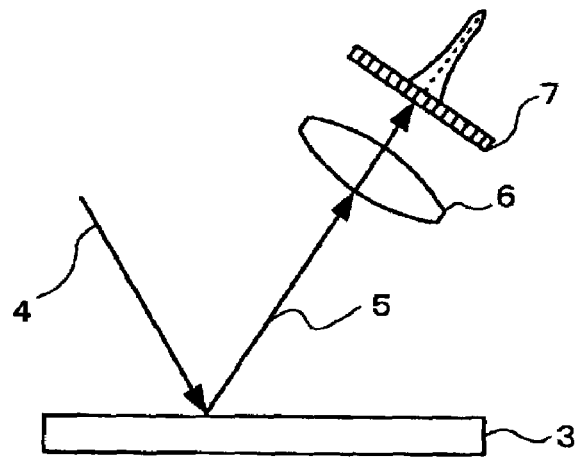
(b) A schematic sectional view of the displacement sensor head unit
A view showing an exemplary application of
the imaging unit of the present invention A block diagram showing the structure of the visual measurement device embodying the present invention

DISPLACEMENT SENSOR

TECHNICAL FIELD

The present invention relates to a displacement sensor for measuring a displacement of an object by using a light section method, and producing the measured value as it is or producing a determination result by comparing the measured value with a reference value, and in particular to a displacement sensor which allows a various modes of measurement to be performed using a two dimensional imaging device with elongated field of view as a light receiving device.

BACKGROUND OF THE INVENTION

An optical system of a sensor head of a conventional optical displacement sensor is shown in FIG. 28. In the drawing, numeral 500 denotes a sensor head unit, numeral 501 denotes a laser diode for emitting a sectional light for the light sectional method, numeral 502 denotes a slit for making the cross section of the sectional light into a linear shape, numeral 503 denotes a light emitting lens, numeral 504 denotes a light receiving lens, numeral 505 denotes a light receiving device such as a PDS, one-dimensional CCD or the like, numeral 600 denotes a measurement object, numeral 700 denotes a stage, and SP denotes a sectional light image (linear bright line) formed on a measurement position of the measurement object 600.

Because the light receiving device 505 of the conventional optical displacement sensor consisted of a PSD or one-dimensional CCD that can capture only one-dimensional information, a highly complicated scanning mechanism was necessary to effect a relative movement between the sensor head 500 and the measurement object 600 as shown in FIG. 29, and a problem has been pointed out that this leads to an increase in the cost.

An optical displacement sensor using a two dimensional imaging device as a light receiving device has recently been proposed, and the two dimensional imaging device used in such a displacement sensor typically consisted of a low-end two dimensional CCD which is typically used in digital cameras and video cameras to minimize cost.

When a two dimensional CCD is used as a light receiving device of a displacement sensor, it is required to have a large number (such as hundreds) of pixels to achieve a required precision or resolution in the direction of displacement measurement, but a relatively small number (tens to one hundred) of pixels in the direction perpendicular to the measurement direction.

However, the pixel arrangement of such a low end two dimensional CCD includes hundreds to thousands (with an aspect ratio of 3 to 4) in both the vertical and horizontal directions as shown in FIG. 30. Therefore, a significant time period is required to read the received electric charges for each shot, and this impairs the responsiveness of the measurement. Also, OB denotes optically black region.

As a measure for achieving high speed shots, it is possible to use a specialized CCD imaging device having a smaller number of horizontal lines (60 to 70 lines for instance) so as to suit the elongated rectangular field of view for measurement. However, such a CCD imaging device must be specially ordered, and tends to be expensive because of the high cost of development and the long time period required for the development.

This invention was made in view of such problems, and its primary object is to provide a displacement sensor which is suited for imaging an elongated field of view at high speed and at high precision for a variety of process modes of measurement in a highly responsive manner, and at the same time, can be provided at low manufacturing cost.

BRIEF SUMMARY OF THE INVENTION

The displacement sensor of the present invention comprises of an imaging unit for imaging a surface of a measurement object having a sectional light image from such an angle as to make a position of the light image look different in dependence on a displacement of the measurement object, and an image processing unit for computing the displacement of the measurement object by processing an image obtained from the imaging unit.

The imaging unit may comprise a two dimensional imaging device including a group of light receiving pixels arranged in a matrix so as to correspond to a field of view of a standard imaging unit, a plurality of vertical shift registers corresponding to different columns of the pixels, and a horizontal shift register for receiving the outputs of the vertical shift registers from top stages thereof, a photosensitive pixel region being defined in a prescribed horizontal band having a sufficiently narrower width than that would be provided by the total number of horizontal lines and interposed between a front optically black pixel region and a back optically black pixel region, and a drive control unit for controlling, according to a commanded electric charge transfer protocol a feeding of signal electric charges from each group of light receiving pixels to the vertical shift register of a corresponding column, a vertical transfer of signal electric charges in the vertical shift register of each column, and a horizontal transfer of signal electric charges in the horizontal shift register.

The image processing unit may comprise electric charge transfer protocol command means for giving an electric charge transfer protocol to the drive control unit of the imaging unit in dependence on a content of the image process.

The "standard imaging unit" includes at least common digital still cameras and video cameras. As a current commercially available product, there is a two dimensional imaging device for a digital still camera having a pixel layout pattern of 788 pixels (vertical) by 1,077 pixels (horizontal). Likewise, as a two dimensional imaging device for a video camera, there is one having a pixel layout pattern of 500 pixels (vertical) by 500 to 600 pixels (horizontal).

The term "sufficiently narrower" is intended to mean an elongated rectangular field of view of a displacement sensor in which the imaging device of the present invention is used. When the field of view that is required of a displacement sensor is considered, it is sufficient that the number of horizontal lines belonging to the prescribed horizontal band is approximately 20% or less of the entire number of horizontal lines in most cases. The capability to perform high speed shots in association with an elongated field of view while ensuring a high level of resolution in the lengthwise direction is highly advantageous for an imaging device that is used in a displacement sensor based on a light section method.

An "optically black pixel" consists of a pixel which is disabled to detect light by a light shield mask, or modified so as to prevent electric charges from accumulating or accumulated electric charges from being delivered, and its output level is at a prescribed dark level without regard to the intensity of the received light. A "photosensitive pixel" consists of a normal pixel without any such modification, and its output level is at a light level corresponding to the intensity of the received light.

According to such a structure, the group of light receiving pixels belonging to the photosensitive pixel region generate electric charges corresponding to the intensity of the received light in response to the light image from an elongated object region serving as an imaging object. The light receiving pixels belonging to the front and back optically black pixel regions do not respond to the light image arriving from areas other than the elongated object region serving as an imaging object, and therefore generate substantially no electric charges.

Of all the stages of the vertical shift register of each column, those stages corresponding to the photosensitive pixel region transfer and store electric charges corresponding to the intensity of the received light. Those stages corresponding to the front and back optically black pixel regions transfer and store substantially no electric charges.

Therefore, owing to the operation of the drive control unit, when all of the electric charges of the photosensitive pixel region have been read following those of the front and back optically black pixel regions, by not reading or by reading at high speed all or part of the electric charges from the back optically black region, the time period required for reading the electric charges of each frame can be reduced, and a high speed imaging is made possible through reduction in the time period required for each shot. In addition, only a minor modification has been made to the two dimensional imaging device itself, therefore it can be produced at low cost and would not increase the cost of overall imaging unit.

According to a preferred embodiment of the present invention, the sectional light image on the surface of the measurement object is formed by a sectional light beam having a linear cross section. Thereby, a linear light image (bright line) extending in a direction perpendicular to the measurement direction (a direction perpendicular to a plane containing the light emitting axial line and light receiving axial line) is formed on the light receiving surface of the imaging device so that the information necessary for region measurement can be obtained in a reliable manner.

According to a preferred embodiment of the present invention, the prescribed horizontal band is placed adjacent to the horizontal shift register in the two dimensional imaging device.

As for the front optically black pixel region which is interposed between the horizontal shift register and the prescribed horizontal band (photosensitive pixel region), without regard to whether all the lines are read out simultaneously or for each prescribed number of lines over a number of times, they must be all read out. Therefore, the smaller the number of lines of the front optically black pixel region is, the lesser the time period is that is required before starting to read the effective part of the image. Also, because a sufficiently narrow prescribed horizontal band is placed adjacent to the horizontal register, the back optically black pixel region which does not give rise to any time period for reading electric charges accounts for a large part of the total number of horizontal lines, and the time period required for reading each frame can be substantially reduced.

According to a preferred embodiment of the present invention, the total number of horizontal lines in the prescribed horizontal band is 20% or less or 10% or less of the total number of horizontal lines in the two dimensional imaging device.

According to a preferred embodiment of the present invention, the two dimensional imaging device is provided with a light receiving pixel arrangement pattern which corresponds to the aspect ratio of the field of view of a common digital still camera, normal TV camera or HD TV camera.

According to a preferred embodiment of the present invention, each of the optically black pixels is provided with a device structure in which a photoelectric transducer is covered by a light shield mask, a photoelectric transducer is disabled and/or an electric charge path between a photoelectric transducer and the corresponding vertical shift register is cut.

According to a preferred embodiment of the present invention, the horizontal lines of the two dimensional imaging device extend in a direction along which the position of the light image changes on the two dimensional imaging device with a displacement of the measurement object.

According to this arrangement, because the light image can be captured by the photosensitive pixels over a wide range even when the position of the light image has shifted on the two dimensional imaging device due to the displacement of the measurement object, the displacement range that can be measured by the displacement sensor can be maximized.

According to a preferred embodiment using a measurement light beam having a linear cross section, the horizontal lines of the two dimensional imaging device extend in a direction perpendicular to a direction along which the position of the light image changes on the two dimensional imaging device with a displacement of the measurement object.

According to this arrangement, because an elongated region extending along the radiation position having a linear shape can be covered within the field of view, the distribution of height within this elongated region can be measured all at the same time.

In the displacement sensor of the present invention, the contents of the command on the electric charge transfer protocol issuing from the image processing unit may vary a great deal.

According to one of a number of possible electric charge transfer protocols, a signal electric charge feeding process for feeding signal electric charges from each light receiving pixel to the vertical shift register of the corresponding column at the beginning of each vertical interval, a front optically black pixel region handling process for transferring signal electric charges in the vertical shift register of each column fed from a front optically black pixel region to the horizontal shift register, and a photosensitive pixel region handling process for reading signal electric charges on the vertical shift register of each column fed from the photosensitive pixel region to an external circuit by appropriately linking the transfer of the vertical shift register of each column with the transfer of horizontal shift register are repeated without performing a back optically black pixel region handling process for transferring signal electric charges in the vertical shift register of each column fed from a back optically black pixel region to the horizontal shift register. According to this electric charge transfer protocol the time period required for reading out a single frame may be reduced by the time period saved by not performing the back optically black pixel region handling process.

In other words, owing to the operation of the drive control unit, when all of the electric charges of the photosensitive pixel region have been read following those of the front optically black pixel region, without waiting for the electric charges of the back optically black pixel region to be read out, the shutter is opened to effect an overwrite exposure, and the reading out of the electric charges of the front optically black pixel region and photosensitive pixel region and the overwriting of the electric charges of the back optically black pixel region are repeated thereafter.

Once the electric charges of the photosensitive pixel region are all read out, as the electric charges in the various stages of each vertical shift register belonging to the back optically black pixel region are substantially zero, there will be no substantial problem of double exposure even when the overwrite exposure is performed.

Therefore, the time period required for reading out the electric charges for each frame can be reduced by not reading the electric charges from the back optically black pixel region, and this allows successive shots to be taken at high speed.

In this electric charge transfer protocol, the front optically black pixel region handling process may include a process of repeatedly performing a plurality of stages of consecutive vertical transfer for each horizontal interval over one or a plurality of horizontal intervals. At this time, the process of performing a plurality of stages of consecutive vertical transfer for each horizontal interval may be performed during the horizontal interval while the transfer of the horizontal shift register is being suspended during the horizontal interval. Thereby, the unnecessary image which is obtained from the front optically black pixel region can be expelled to the horizontal shift register at high speed. In the electric charge transfer protocol mentioned above, the photosensitive pixel region handling process may comprise a process of performing one or a plurality of stages of consecutive vertical transfer and performing consecutive horizontal transfer of a number of stages corresponding to the number of pixels in each horizontal line one after the other in a time shift within a horizontal interval. Thereby, the stored electric charges are put into the video signal every time the transfer of electric charges for one or a plurality of horizontal lines have been transferred, and this simplifies the image processing based on the video signal.

According to a preferred embodiment of the present invention, the horizontal lines of the two dimensional imaging device extend in a direction along which the position of the light image changes on the two dimensional imaging device with a displacement of the measurement object, and the contents of the command on the electric charge transfer protocol issuing from the image processing unit comprise a repeated execution of a signal electric charge feeding process for feeding signal electric charges from each light receiving pixel to the vertical shift register of the corresponding column at the beginning of each vertical interval, a front optically black pixel region handling process for transferring signal electric charges in the vertical shift register of each column fed from a front optically black pixel region to the horizontal shift register, and a photosensitive pixel region handling process for reading signal electric charges on the vertical shift register of each column fed from the photosensitive pixel region to an external circuit by appropriately linking the transfer of the vertical shift register of each column with the transfer of horizontal shift register, without performing a back optically black pixel region handling process for transferring signal electric charges in the vertical shift register of each column fed from a back optically black pixel region to the horizontal shift register, so that the time period required for reading out a single frame may be reduced by the time period saved by not performing the back optically black pixel region handling process.

Additionally, the photosensitive pixel region handling process may comprise a process of performing a plurality of stages of consecutive vertical transfer and performing consecutive horizontal transfer of a number of stages corresponding to the number of pixels in each horizontal line one after the other in a time shift within a horizontal interval.

According to this electric charge transfer protocol, the averaging process for the light image position information appearing on a plurality of horizontal lines can be performed at high speed within the two dimensional imaging device. When this process is applied for the purpose of removing the influences of the surface textures of the measurement object and noises, a displacement measurement of high precision can be effected in a stable manner.

In this case, the photosensitive pixel region handling process may comprise a process of transferring the electric charges of all the horizontal lines in the photosensitive pixel region all at the same time to have the pixel electric charges of each vertical column to be superimposed one over the other while the horizontal transfer is suspended during one or a plurality of horizontal intervals. Thereby, an entire line comprehensive averaging process for the photosensitive pixel region may be performed within the two dimensional imaging device. In other words, the contents of the horizontal shift register are produced from the two dimensional imaging device only once for each shot, and the peak position of the produced signal represents the average value of the height or displacement of the surface of the measurement object corresponding to the photosensitive pixel region.

According to another possible electric charge transfer protocol a signal electric charge feeding process for feeding signal electric charges from each light receiving pixel to the vertical shift register of the corresponding column at the beginning of each vertical interval, a front optically black pixel region handling process for transferring signal electric charges in the vertical shift register of each column fed from a front optically black pixel region to the horizontal shift register at high speed, a photosensitive pixel region handling process for reading signal electric charges on the vertical shift register of each column fed from the photosensitive pixel region to an external circuit by appropriately linking the transfer of the vertical shift register of each column with the transfer of horizontal shift register, and a back optically black pixel region handling process for transferring signal electric charges in the vertical shift register of each column fed from a back optically black pixel region to the horizontal shift register at high speed are repeatedly executed.

According to this electric charge transfer protocol, owing to the operation of the drive control unit, the electric charges of the front and back optically black pixel regions are read in a single body that covers a number of horizontal lines. Because the stages of the vertical shift registers corresponding to the front and back optically black pixel regions store substantially no electric charges, no matter how many lines worth of electric charges are added in each stage of the horizontal shift register, the electric charges would not saturate in any of the stages of the horizontal shift register in theory. Therefore, the electric charges of the unnecessary horizontal lines are all added up, and read out at high speed while the electric charges of the prescribed horizontal band consisting of a photosensitive pixel region are read at a desired precision so that the time period required for reading the electric charges of each frame can be reduced and a high speed imaging can be enabled by reducing the time period of each shot.

In this electric charge transfer protocol, the front optically black pixel region handling process and/or the back optically black pixel region handling process may include a process of repeatedly performing a plurality of stages of consecutive vertical transfer for each horizontal interval over one or a plurality of horizontal intervals. At this time, the process of performing a plurality of stages of consecutive vertical transfer for each horizontal interval may be performed during the horizontal interval while the transfer of the horizontal shift register is being suspended during the horizontal interval.

In this electric charge transfer protocol the photosensitive pixel region handling process may comprise a process of performing one or a plurality of stages of consecutive vertical transfer and performing consecutive horizontal transfer of a number of stages corresponding to the number of pixels in each horizontal line one after the other in a time shift within a horizontal interval.

According to a preferred embodiment of the present invention, the horizontal lines of the two dimensional imaging device extend in a direction along which the position of the light image changes on the two dimensional imaging device with a displacement of the measurement object, and the contents of the command on the electric charge transfer protocol issuing from the image processing unit comprise a repeated execution of a signal electric charge feeding process for feeding signal electric charges from each light receiving pixel to the vertical shift register of the corresponding column at the beginning of each vertical interval, a front optically black pixel region handling process for transferring signal electric charges in the vertical shift register of each column fed from a front optically black pixel region to the horizontal shift register at high speed, a photosensitive pixel region handling process for reading signal electric charges on the vertical shift register of each column fed from the photosensitive pixel region to an external circuit by appropriately linking the transfer of the vertical shift register of each column with the transfer of horizontal shift register, and a back optically black pixel region handling process for transferring signal electric charges in the vertical shift register of each column fed from a back optically black pixel region to the horizontal shift register at high speed, so that the time period required for reading out a single frame may be reduced by the time period saved by transferring signal electric charges in the vertical shift register of each column fed from the front and back optically black pixel regions at high speed.

Additionally, the photosensitive pixel region handling process may comprise a process of performing a plurality of stages of consecutive vertical transfer and performing consecutive horizontal transfer of a number of stages corresponding to the number of pixels in each horizontal line one after the other in a time shift within a horizontal interval.

According to this electric charge transfer protocol the averaging process for the light image position information appearing on a plurality of horizontal lines can be performed at high speed within the two dimensional imaging device. When this process is applied for the purpose of removing the influences of the surface textures of the measurement object and noises, a displacement measurement of high precision can be effected in a stable manner.

In this case, the photosensitive pixel region handling process may comprise a process of transferring the electric charges of all the horizontal lines in the photosensitive pixel region all at the same time to have the pixel electric charges of each vertical column to be superimposed one over the other while the horizontal transfer is suspended during one or a plurality of horizontal intervals. Thereby, an entire line comprehensive averaging process for the photosensitive pixel region may be performed within the two dimensional imaging device. In other words, the contents of the horizontal shift register are produced from the two dimensional imaging device only once for each shot, and the peak position of the produced signal represents the average value of the height or displacement of the surface of the measurement object corresponding to the photosensitive pixel region.

The basic image processing which takes place in the image processing unit may consist of measuring the height of each measurement line. The measurement line as used herein means a single horizontal line or an average or sum of the electric charge information of a plurality of horizontal lines arranged in the vertical direction in the photosensitive pixel region of the two dimensional imaging device. The height of a measurement line is the height or displacement of a surface of a measurement object which is computed from the peak position of the electric charges in the measurement line.

The content of the image processing that is performed in the image processing unit may include the action of computing the height of each measurement line and finding a peak to peak distance or a variance so that a flaw is measured.

The content of the image processing that is performed in the image processing unit may include the action of computing the height of each measurement line and finding a peak so that a projection is measured.

The content of the image processing that is performed in the image processing unit may include the action of computing the height of each measurement line and finding a bottom so that a groove is measured.

The content of the image processing that is performed in the image processing unit may include the action of computing the height of each measurement line and finding an inclination so that an inclination is measured.

The content of the image processing that is performed in the image processing unit may include the action of computing the height of each measurement line and finding a time average of the heights so that a coplanarity is measured by a relative movement of the sensor and a work.

In the above described displacement sensor, the electric charge transfer protocol command means gave an electric charge transfer protocol to the drive control unit of the imaging unit. Therefore, the electric charge transfer protocol can be changed in dependence on a content of the image process so that a large variety of image processing can be executed without any difficulty. On the other hand, even when the displacement sensor is provided with a fixed electric charge transfer protocol, it still provides the advantage in high speed imaging. In such a case, there is no dynamic linking is required between the imaging unit and the image processing unit, and the image unit and image processing unit may be initially incorporated with a same electric charge transfer protocol.

Alternatively, an electric charge transfer protocol may be given from the outside of the imaging unit and the image processing unit from time to time so that the image unit and image processing unit may use a same electric charge transfer protocol at all times.

From this view point, the present invention may also be characterized in the following manner. The displacement sensor of the present invention comprises an imaging unit for imaging a surface of a measurement object having a sectional light image from such an angle as to make a position of the light image look different in dependence on a displacement of the measurement object, and an image processing unit for computing the displacement of the measurement object by processing an image obtained from the imaging unit.

The imaging unit may comprise a two dimensional imaging device including a group of light receiving pixels arranged in a matrix so as to correspond to a field of view of a standard imaging unit, a plurality of vertical shift registers corresponding to different columns of the pixels, and a horizontal register for receiving the outputs of the vertical shift registers from top stages thereof, a photosensitive pixel region being defined in a prescribed horizontal band having a sufficiently narrower width than that would be provided by the total number of horizontal lines and interposed between a front optically black pixel region and a back optically black pixel region, and a drive control unit for controlling, according to a commanded electric charge transfer protocol a feeding of signal electric charges from each pixel to the vertical shift register of a corresponding column, a vertical transfer of signal electric charges in the vertical shift register of each column, and a horizontal transfer of signal electric charges in the horizontal shift register.

The image processing unit may be adapted to perform an image processing based on a same electric charge transfer protocol as that used by the drive control unit of the imaging unit.

The various features of the previously discussed aspects of the present invention such as the optical arrangement, structure of the two dimensional imaging device and contents of the electric charge transfer protocol are applicable to this aspect of the present invention as can be readily appreciated.

BRIEF DESCRIPTION OF THE DRAWINGS

FIG. 8 is a diagram showing the structure of the transfer protocol table (first method for reading an image at high speed);

FIG. 9 is a diagram showing the contents of L1, L2 and OE;

FIG. 14 is a table showing the data structure of a single frame in the exemplary drive mode of the imaging device of the present invention (first method for reading an image at high speed);

FIG. 15 is a diagram showing the structure of the transfer protocol table (second method for reading an image at high speed);

FIG. 17 is a table showing the data structure of a single frame in the exemplary drive mode of the imaging device of the present invention (second method for reading an image at high speed);

FIG. 19 is a diagram showing the contents of the transfer protocol table for the entire line comprehensive averaging process;

FIG. 21 is a view showing an exemplary application of the entire line comprehensive averaging process;

FIG. 23 is a diagram showing the image process for measuring a flaw;

FIG. 24 is a diagram showing the image process for measuring a projection;

FIG. 25 is a diagram showing the image process for measuring a groove;

FIG. 26 is a diagram showing the image process for measuring an inclination;

FIG. 27 is a diagram showing the image process for measuring a coplanarity;

FIG. 31 is a view showing an exemplary application of the imaging unit of the present invention.

DETAILED DESCRIPTION OF THE PREFERRED EMBODIMENTS

Figure 1:
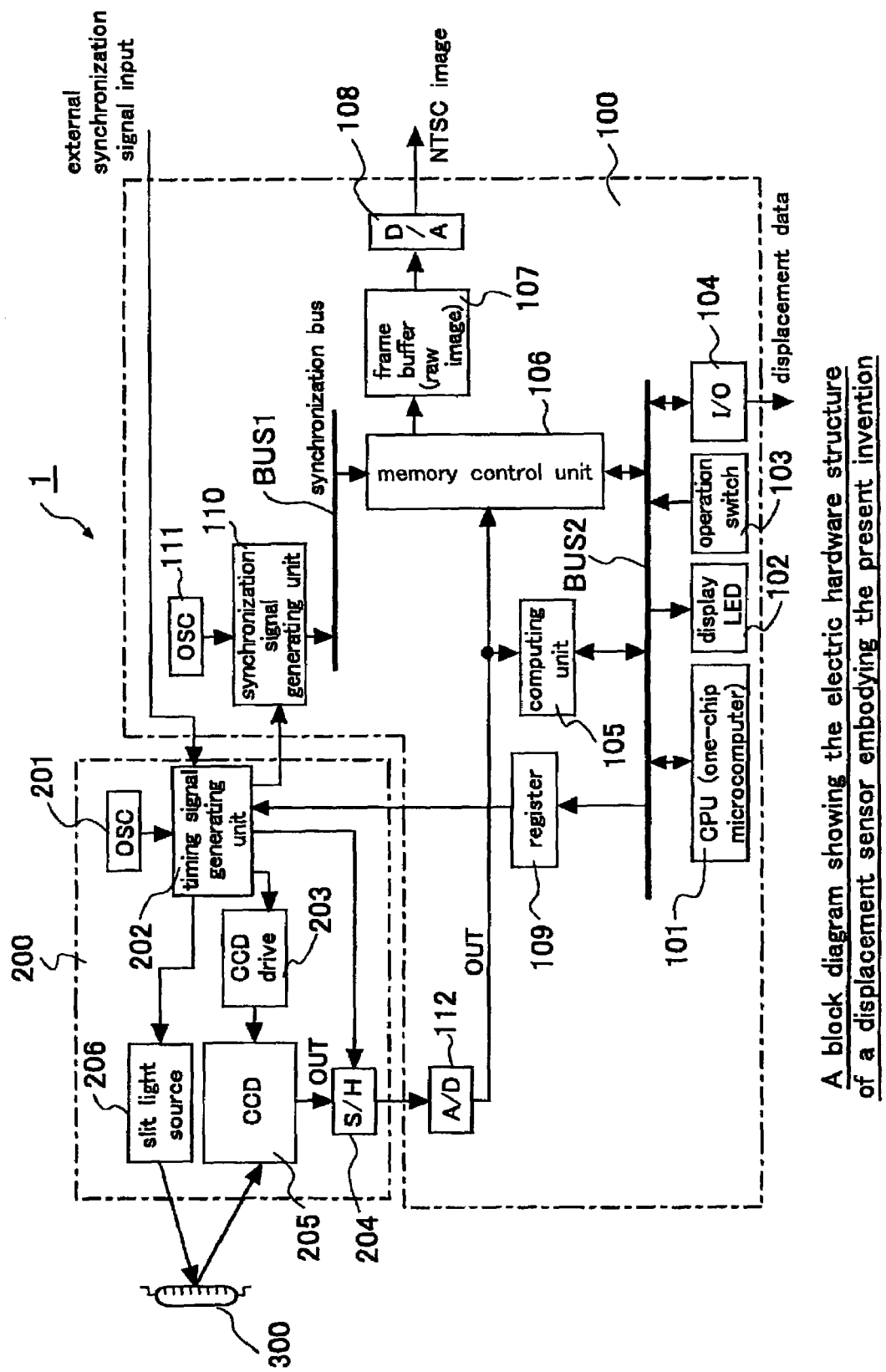
FIG. 1 is a block diagram showing the electric structure of a displacement sensor embodying the present invention.

FIG. 1 is a block diagram showing the electric hardware structure of a displacement sensor embodying the present invention.

Referring to the drawing, this displacement sensor 1 essentially consists of a sensor head unit 200 forming an imaging unit for capturing the image of the surface of a measurement object 300 showing a sectional light image thereon from such an angle that the light image may change its position on the surface of the measurement object 300 with the displacement of the measurement object 300, and a sensor main unit 100 forming an image processing unit for computing the measurement object displacement and producing it as displacement data by processing the image obtained by the sensor head unit 200.

The sensor head unit 200 produces a required timing signal according to an oscillator (OSC 201) and a transfer protocol table stored in a register 109 provided in the sensor main unit 100, and forwards it to a CCD drive 203 and a slit light source 206. The slit light source 206 consists of a laser diode 207 and a slit 208, and produces a sectional light beam (linear bright line) for the light section method to impinge it onto the measurement object 300. As a result, the sectional light beam for measurement forms a radiation light image (linear bright line) on the surface of the detection object. The surface of the measurement object 300 on which the linear bright line is formed is captured by a CCD 205 which is a two-dimensional imaging device. The CCD 205 is controlled of its signal transfer by transfer pulses TP1 to TP3 forwarded from the CCD drive 203 as described hereinafter. The video signal obtained from the CCD 205 is smoothly shaped by a sample hold circuit 204, and forwarded to the sensor main unit 100.

Figure 2:
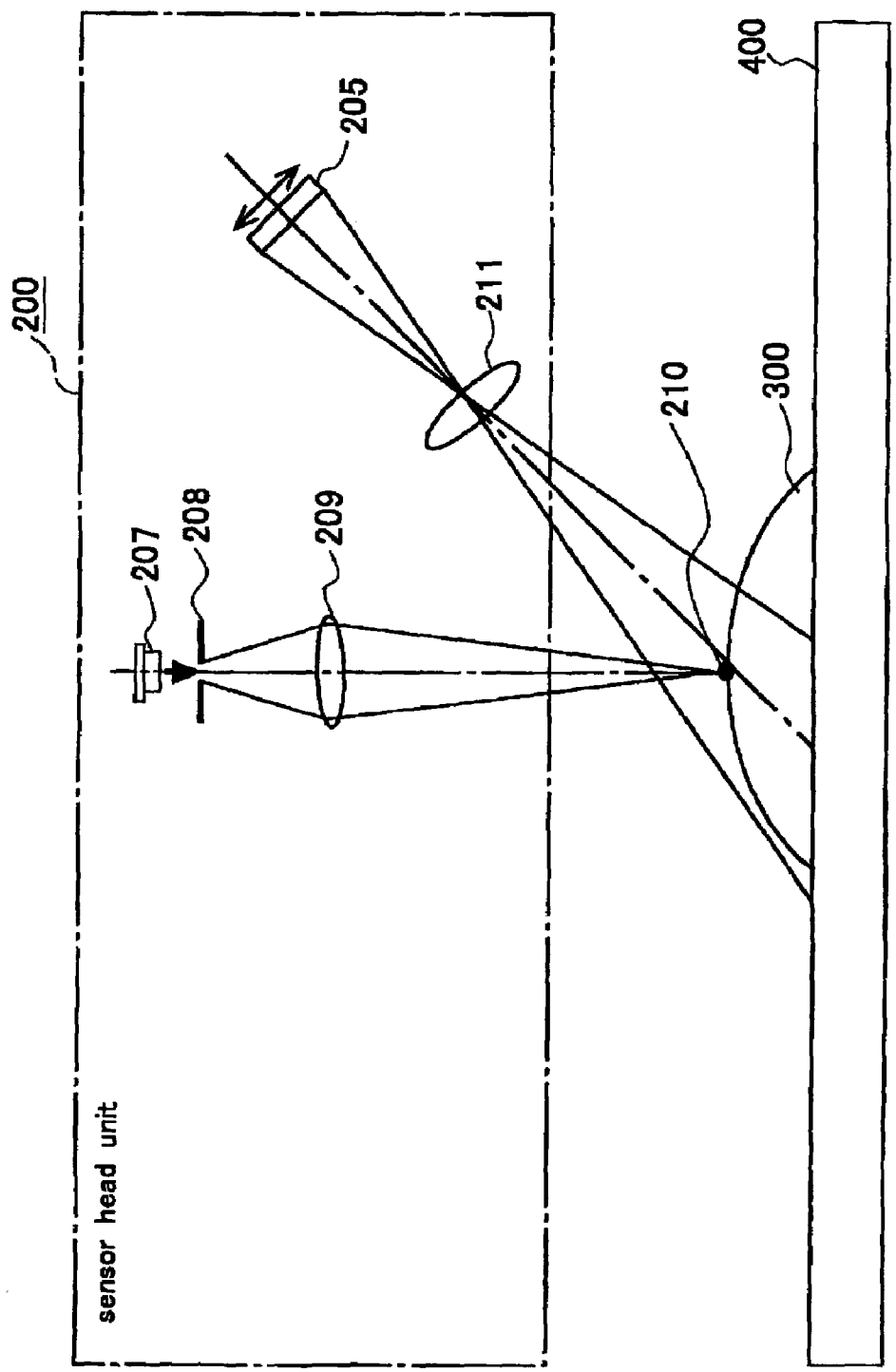
FIG. 2 is a diagram showing the optical system of the sensor head unit of the displacement sensor of the present invention.

FIG. 2 shows the optical system of the sensor head unit 200. In this drawing, numeral 207 denotes a laser diode, numeral 208 denotes a slit, numeral 209 denotes light emitting lens, numeral 210 denotes a sectional light image, numeral 211 denotes a light receiving lens, numeral 205 denotes a CCD, numeral 300 denotes a measurement object, and numeral 400 denotes a stage on which the measurement object is placed. The laser beam emitted from the laser diode 207 is shaped into a light beam having a linear cross section (which may be called as a line beam) by passing through the slit 208, and impinged upon the surface of the measurement object 300 through light emitting lens 209. The resulting sectional light image 210 is captured by the CCD 205 from a prescribed angle via the light receiving lens 211. As well known in the art, the image capturing angle of the CCD 205 is determined in such a manner that the position of the light image 210 changes with the change in the height of the measurement object 300.

An exemplary application of the two dimensional imaging device of the present application to a displacement sensor using a light section method as a detection principle is schematically illustrated in FIG. 31 in which 31(*a*) is a schematic perspective view of the displacement sensor head unit, and 31(*b*) is a schematic sectional view of the displacement sensor head unit.

In the drawing, numeral 91 denotes a measurement object, 92 a line beam (having a linear cross section) for measurement, 93 a reflected light beam, 94 a lens system, 95 a two dimensional imaging device, 96 a horizontal scan direction of the two dimensional imaging device, 97 a vertical scan direction of the two dimensional imaging device, and 98 a prescribed horizontal band on the light receiving surface of the two dimensional imaging device. The line beam 92, in this case, consists of a standard line beam having a 0.1 by 5 mm cross section. The vertical displacement of the measurement object 91 appears as a displacement of the light image of the reflected line beam in the horizontal scan direction of the two dimensional imaging device 97. The elongated field of view formed by the prescribed horizontal band 98 extends along the direction of such a displacement.

Figure 3:
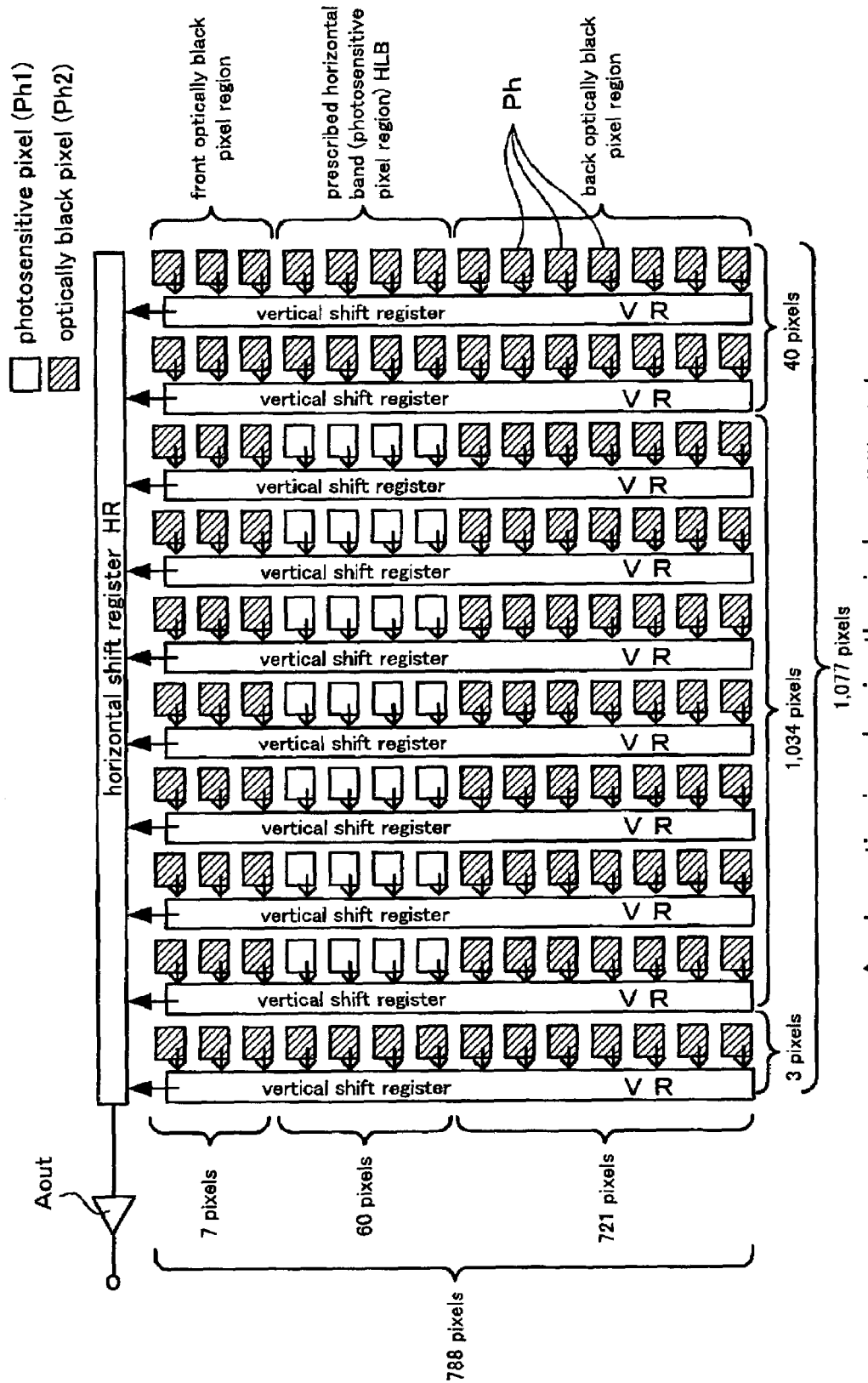
FIG. 3 is a diagram schematically illustrating the pixel arrangement on the light receiving surface of the imaging device of the sensor head unit.

The CCD imaging device 212 has a novel structure proposed by the inventors. A typical layout pattern of pixels of the CCD imaging device is schematically illustrated in FIG. 3. The size of the pixels are somewhat exaggerated for the convenience of illustration.

Referring to FIG. 3, Ph denotes each of the light receiving pixels of a group arranged in a matrix of 788 (vertical) by 1,077 (horizontal) so as to correspond to the field of view of a standard imaging unit consisting of a digital still camera, VR denotes vertical shift registers for vertically transferring the outputs of the light receiving pixels Ph in the group for each column, HR denotes a horizontal shift register for receiving electric charges transferred from the vertical shift registers of the respective columns and transferring them horizontally, and Aout denotes an output buffer for sending out the electric charges transferred from the horizontal register HR to an external circuit.

Of all the pixels Ph, the white pixels Ph1 consist of photosensitive pixels while the hatched pixels Ph2 consist of optically black pixels (OB pixels). These pixels Ph1 and Ph2 essentially consist of photodiode devices. The vertical and horizontal shift registers VR and HR essentially consist of CCD devices.

As mentioned earlier, an optically black pixel Ph2 consists of a pixel which is disabled to detect light by a light shield mask, or modified so as to prevent electric charges from accumulating or accumulated electric charges from being delivered, and its output level is at a prescribed dark level (corresponding to substantially zero electric charges) without regard to the intensity of the received light. A photosensitive pixel Ph1 consists of a normal pixel without any such modification, and its output level is a light level corresponding to the intensity of the received light.

A pixel can be made into an optically black pixel Ph2, instead of a photosensitive pixel Ph1, in a number of different ways. As a first method, the photoelectric transducer (such as a photodiode or a phototransistor) forming the light receiving pixel in question may be covered with a light shield mask. More specifically, during the semiconductor fabrication process, a light shield mask can be prepared as an opaque metal mask which is formed over the photodiode intended to form the light receiving pixel in question. It is also possible to attach an opaque mask (such as aluminum foil) over the light receiving surface of the device as a light shield mask in a step following the completion of the semiconductor fabrication process (after purchasing the product, for instance). However, when the light shield mask is attached in place following the completion of the semiconductor manufacturing process, it is possible that a misalignment with the pixels occurs or that an incompletely shielded pixel region is produced along the boundary between the optically black pixel region and the photosensitive pixel region because of a significant distance between the pixels and mask. Therefore, it is preferable to form the mask during the semiconductor manufacturing process.

As a second method, the device can be disabled to receive light or to convert the received light into electricity by modifying the device structure of the photodiode intended to form the light receiving pixel during the semiconductor fabrication process.

As a third method, the path of transferring electric charges from the photodiode intended to form the light receiving pixel in question to the corresponding vertical shift register is cut during the semiconductor manufacturing process.

No matter which of the three methods is selected, the cost and time can be substantially reduced as compared to the case where a new special CCD device is designed from the scratch which provides a smaller number of horizontal lines (60 to 70 horizontal lines, for instance) so as to suit the elongated rectangular field of view for measurement. These three methods may also be combined as can be readily appreciated.

Referring back to FIG. 3, the group of light receiving pixels arranged in a matrix are grouped into a first subgroup of pixels belonging to a prescribed horizontal band HLB including a sufficiently small number (60 lines) of horizontal lines as compared to the total number (788 lines) of horizontal lines, and a second subgroup of pixels not belonging to the prescribed horizontal band HLB.

In this example, the 60 horizontal lines ranging from the eighth to 67th horizontal lines from the top belong to the prescribed horizontal band HLB, and the pixels belonging to this prescribed horizontal band HLB form the first subgroup. The pixels belonging to the seven horizontal lines ranging from the first to seventh horizontal lines from the top and the 721 horizontal lines ranging from the 68th to 788th (bottom line) horizontal lines from the top form the second subgroup.

All or most of the pixels Ph belonging to the first group consist of photosensitive pixels Ph1, and all or most of the pixels Ph (all of the pixels in this example) belonging to the second group consist of optically black pixels Ph2.

More specifically, of all the pixels Ph belonging to the 60 horizontal lines forming the prescribed horizontal band HLB, the pixels belonging to the three vertical lines on the left edge of the frame and 40 vertical lines on the right edge of the frame all consist of optically black pixels Ph2. The pixels belonging to the 1,034 vertical lines between the left three vertical lines and right 40 vertical lines all consist of photosensitive pixels Ph1. As a result, the photosensitive pixel region (60 rows×1,034 columns) is surrounded by an optically black pixel region, and the profile of the effective image region is clearly defined.

Figure 4:
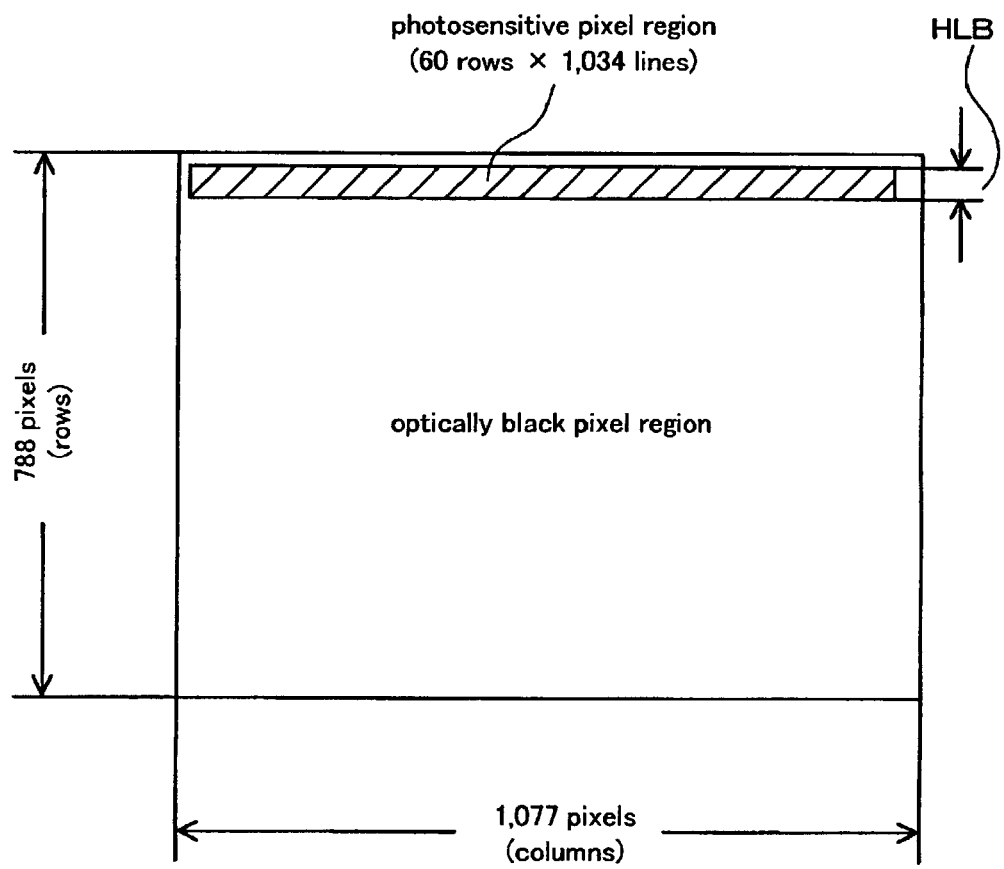
FIG. 4 is a diagram showing the relationship between the photosensitive pixel region and optically black pixel region of the imaging device used in the sensor head of the present invention in an actual aspect ratio.

The relationship between the regions of photosensitive pixels and optically black pixel region in the CCD imaging device is illustrated in FIG. 4 in an actual aspect ratio. As can be appreciated from this drawing, the photosensitive pixel region (60 rows×1,034 columns) accounts for a small part of the entire light receiving surface (788 rows×1,077 columns). It can be also seen that the prescribed horizontal band HLB is placed adjacent to the upper end of the frame at which the horizontal shift register HR is located, and that a most part of the entire light receiving surface (788 rows×1,077 columns) is occupied by the optically black pixel region.

Figure 5:
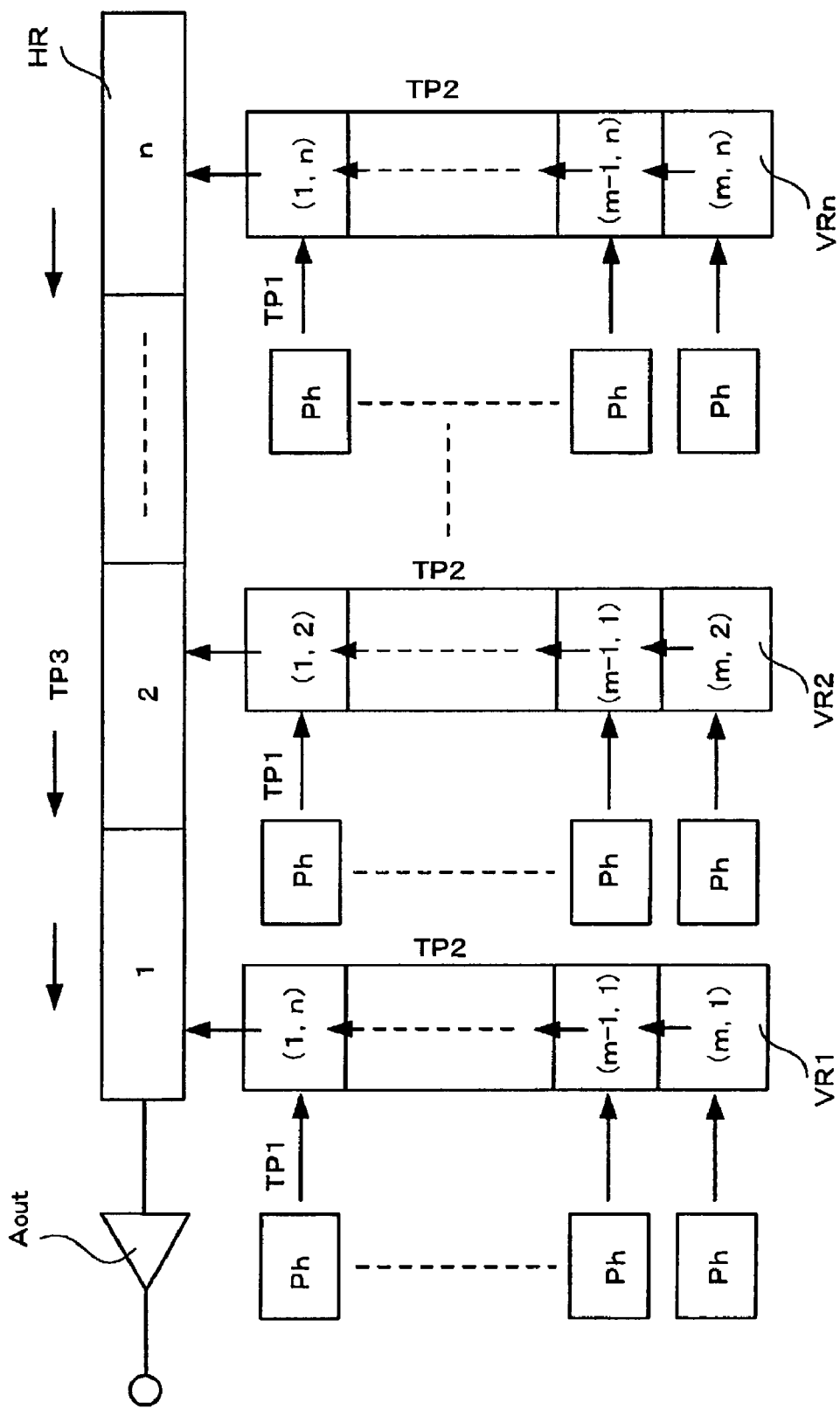
FIG. 5 is a block diagram describing the electric charge transfer circuit of the imaging device.

In this CCD imaging device, as shown in FIG. 5, when a first transfer pulse TP1 is received from outside, the output (electric charges that were accumulated during the open period of the electronic shutter in the case of a photosensitive pixel Ph1 and substantially zero electric charges corresponding to a prescribed dark level in the case of an optically black pixel Ph2) of each pixel belonging to each vertical line is transferred to a corresponding stage of the adjacent vertical shift register VR1 to VRn. When a second transfer pulse TP2 is received from outside, the charges are shifted upward by one stage in each of the vertical shift registers VR1 to VRn, and the electric charges in the top stage of each of the vertical shift registers VR1 to VRn is transferred to the corresponding stage of the horizontal shift register HR. When a third transfer pulse TP3 is received from outside, the electric charges in each stage of the horizontal shift register HR are shifted by one stage to the left in the diagram, and the electric charges stored in the top stage of the horizontal shift register is sent out to an external circuit via an output unit Aout.

The structure of the drive control unit of the CCD imaging device mentioned above is now described in the following. The drive control unit essentially consists of a timing signal generating unit 202 and a CCD drive 203 as shown in FIG. 1. The timing signal generating unit 202 includes a transfer pulse generating unit and a transfer control unit (which are not shown in the drawing).

The transfer control unit determines how many lines of video data should be transferred during a horizontal interval and if image data should be sent out to an external circuit by producing a number of third transfer pulses corresponding to the number of pixels in each horizontal line during each horizontal interval. The determined transfer line number is converted into transfer line number signals L1 and L2 each consisting of a two-bit number, and the presence or absence of an external output is converted into an output present/absent signal OE which is then produced from the transfer pulse generating unit 2.

The data structures of the transfer line number signals L1 and L2 for corresponding numbers of transfer lines and output present/absent signal OE are illustrated in FIGS. 9(a) and 9(b). As shown in the drawings, each transfer line number 1, 2, 4, and 7, are assigned with such codes as "00", "10", "01" and "11", and the upper bit of each of these codes is assigned to L1 while the lower bit is assigned to L2. As for the output present/absent signal OE, "1" indicates the presence of a TP3 output, and "0" indicates the absence of a TP3 output.

Figure 6:
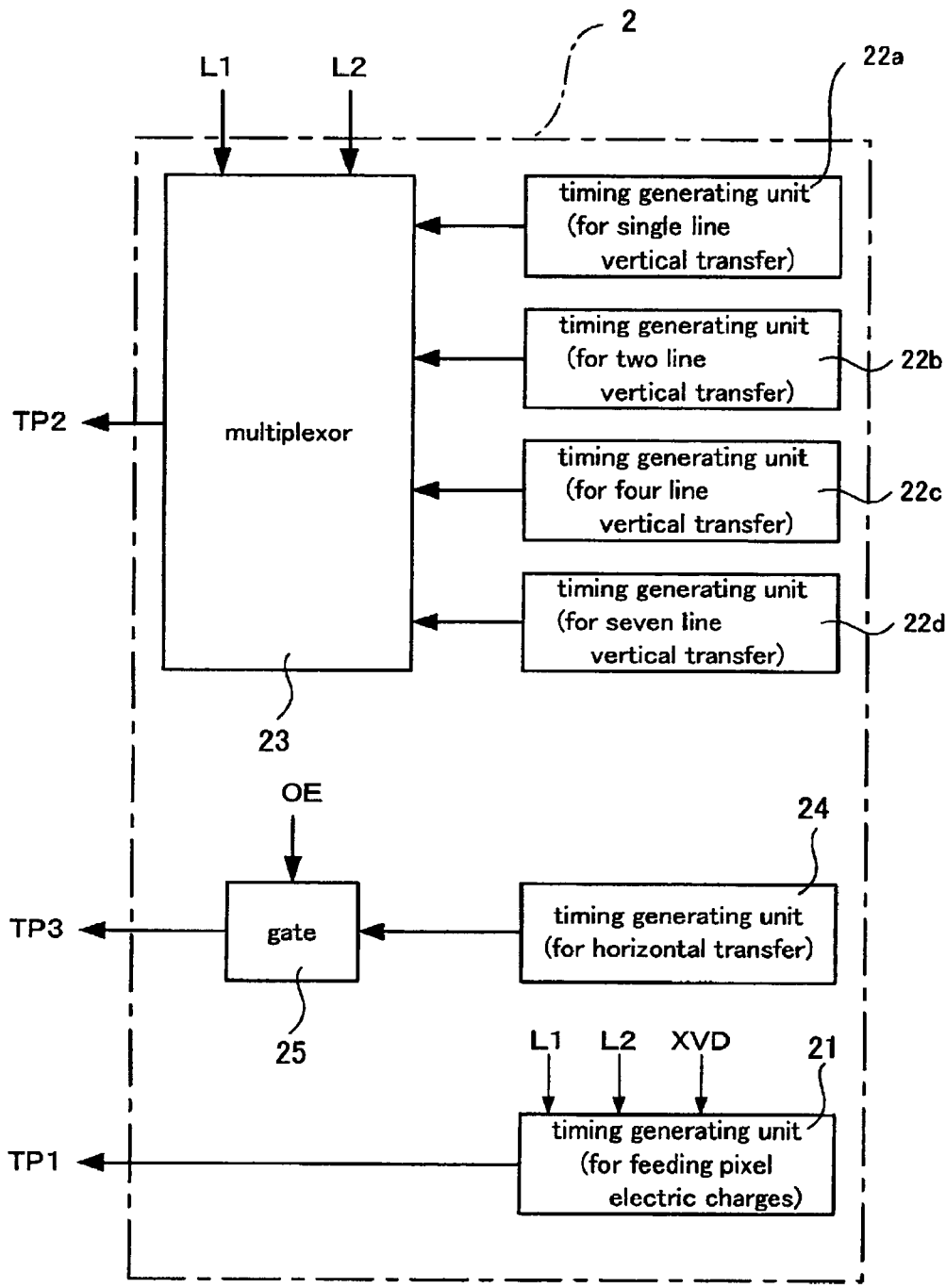
FIG. 6 is a diagram showing the internal structure of the transfer pulse generating unit.

The internal structures of the parts for generating the first to third transfer pulses TP1, TP2 and TP3 in the transfer pulse generating unit 2 are illustrated in FIG. 6. The part for generating the first transfer pulse TP1 comprises a timing generating unit 21 for producing the first transfer pulse TP1 for feeding pixel electric transfer charges in response to a vertical interval start command XVD which is given from outside.

The part for generating the second transfer pulse TP2 comprises four timing generating units 22a, 22b, 22c and 22d, and a multiplexor 23 for selectively producing a pulse train from the timing generating units 22a, 22b, 22c and 22d.

Figure 7:
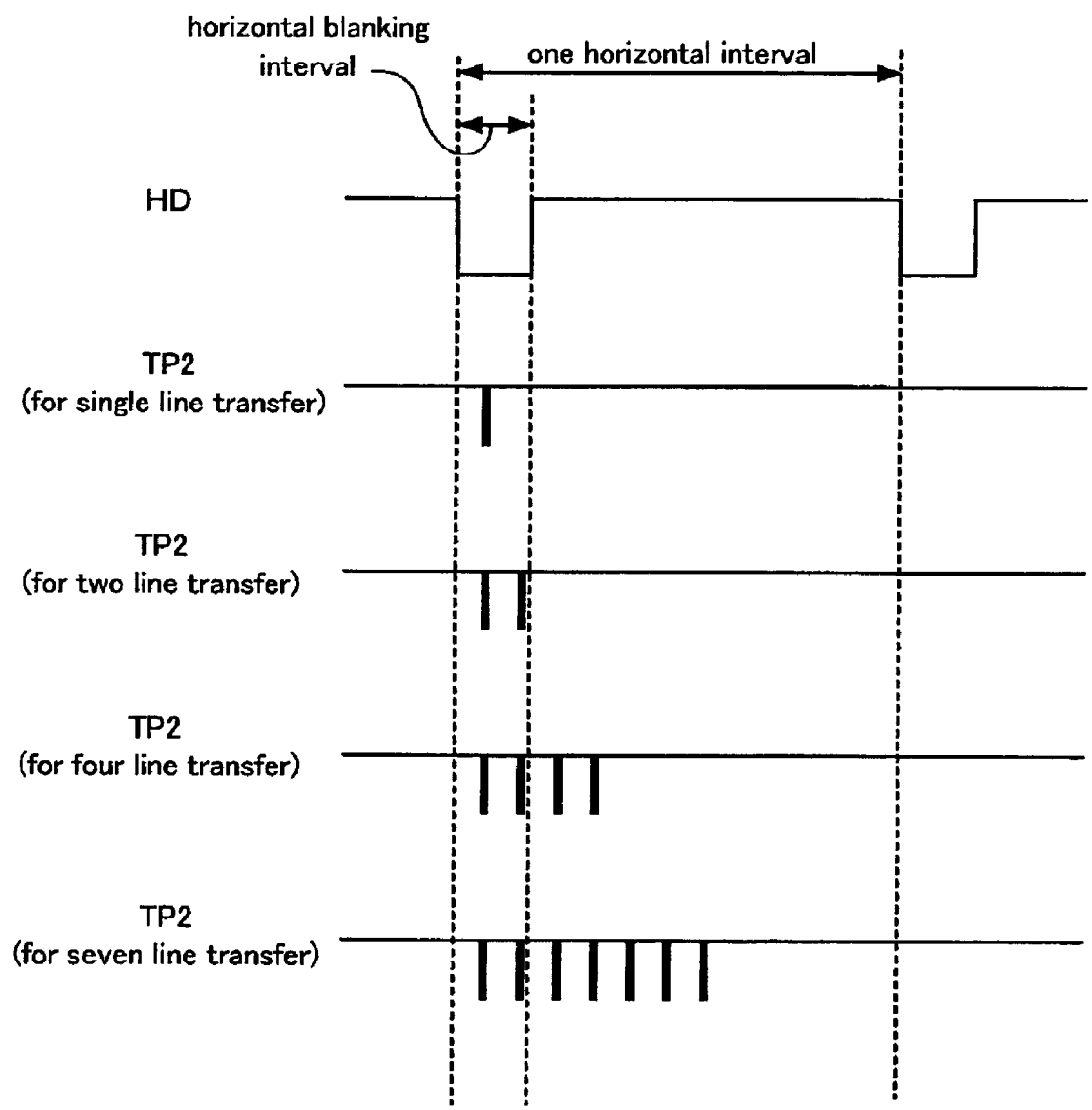
FIG. 7 is a time chart showing the output mode of the transfer pulse (TP2)

The timing generating units 22a, 22b, 22c and 22d are used for transferring one, two, four and seven lines, respectively, and produces a corresponding number of second transfer pulses TP2 during an interval of a same duration as the horizontal interval of the normal video standard. The output modes of the transfer pulses TP2 from the timing generating units 22a, 22b, 22c and 22d are illustrated in FIG. 7.

As shown in the drawing, the timing generating unit 22a for transferring a single line produces a single pulse during the horizontal blanking interval.

The timing generating unit 22b for transferring two lines produces two pulses during the horizontal blanking interval.

The timing generating unit 22c for transferring four lines produces two pulses during the horizontal blanking interval and two more pulses outside the horizontal blanking interval.

The timing generating unit 22d for transferring seven lines produces two pulses during the horizontal blanking interval and five more pulses outside the horizontal blanking interval.

The multiplexor 23 selects one of the timing generating units 22a to 22d corresponding to the line number indicated by the transfer line number signals L1 and L2, and connects the corresponding signal path for the selected signal to the output path of the CCD imaging device 205. As a result, the output pulse of the selected timing generating unit is selected as transfer pulse TP2 and forwarded to the CCD imaging device 205.

Although not shown in the drawing, the generating unit for the first transfer pulse TP1 also consists of four timing generating units for the corresponding transfer line numbers and a multiplexor similarly as described above. The timing generating unit for a single line transfer produces a pulse signal at the timing of the normal video standard, but the timing generating units for two to seven lines produce a pulse during an output interval for electric charges of a single frame that is determined by the transfer line numbers.

By the multiplexor selecting the timing generating unit corresponding to the transfer line number signals L1 and L2 similarly as described above, the output pulse of the selected timing generating unit is produced as the transfer pulse TP1, and is forwarded to the CCD imaging device 205.

The third transfer pulse generating unit comprises a timing generating unit 24 for producing the number of third transfer pulse TP3 corresponding to the number of pixels in each line, and a gate circuit 25 for determining if the third transfer pulse TP3 should be sent out to an external circuit or not in response to the output present/absent signal OE. The gate circuit 25 opens when the output present/absent signal OE is "1", and closes when the output present/absent signal OE is "0".

As described earlier in connection with FIG. 3, in the CCD imaging device 205 of this embodiment, the 60 horizontal lines ranging from the eighth to 67th horizontal lines from the top belong to the photosensitive pixel region (effective image region), and the seven lines ranging from the first to seventh horizontal lines from the top and the 720 horizontal lines ranging from the 68th to 788th horizontal lines from the top form the front and back optically black pixel regions (unnecessary image regions), respectively. To achieve a highly responsive visual measurement device, it is necessary to read the image data (signal electric charges) of each frame as quickly as possible without damaging the data in the effective image region. There are two possible methods for reading an image at high speed.

The first method for reading an image at high speed comprises a signal electric charge feeding process for feeding signal electric charges from each light receiving pixel Ph to the vertical shift register VR1 to VRn of the corresponding column at the beginning of each vertical interval, a front optically black pixel region handling process for transferring signal electric charges in the vertical shift register VR1 to VRn of each column fed from a front optically black pixel region to the horizontal shift register HR, and a photosensitive pixel region handling process for reading signal electric charges on the vertical shift register VR1 to VRn of each column fed from the photosensitive pixel region to an external circuit by appropriately linking the transfer of the vertical shift register VR1 to VRn of each column with the transfer of horizontal shift register HR, without performing a back optically black pixel region handling process for transferring signal electric charges in the vertical shift register VR1 to VRn of each column fed from a back optically black pixel region to the horizontal shift register HR, so that the time period required for reading out a single frame may be reduced by the time period saved by not performing the back optically black pixel region handling process.

The second method for reading an image at high speed comprises a the drive control unit being adapted to repeatedly perform a signal electric charge feeding process for feeding signal electric charges from each light receiving pixel to the vertical shift register VR1 to VRn of the corresponding column at the beginning of each vertical interval, a front optically black pixel region handling process for transferring signal electric charges in the vertical shift register VR1 to VRn of each column fed from a front optically black pixel region to the horizontal shift register HR at high speed, a photosensitive pixel region handling process for reading signal electric charges on the vertical shift register VR1 to VRn of each column fed from the photosensitive pixel region to an external circuit by appropriately linking the transfer of the vertical shift register VR1 to VRn of each column with the transfer of horizontal shift register HR, and a back optically black pixel region handling process for transferring signal electric charges in the vertical shift register VR1 to VRn of each column fed from a back optically black pixel region to the horizontal shift register HR at speed, so that the time period required for reading out a single frame may be reduced by the time period saved by transferring signal electric charges in the vertical shift register of each column fed from the front and back optically black pixel regions at high speed.

A concrete example of the implementation of the first method is described in the following with reference to FIGS. 7 to 14. In this example, the drive control unit (composed of the transfer pulse generating unit 2 and transfer control unit 3 shown in the flowchart of FIG. 10) repeats the signal electric charge feeding process (A), front optically black pixel handing process (B) and photosensitive pixel region handling process (C) without interposing the back optically black pixel handing process (D).

The signal electric charge feeding process (A) consists of feeding signal electric charges from each light receiving pixel Ph(m, n) to the vertical shift register VR1 to VRn of the corresponding column at the beginning of each vertical interval.

The front optically black pixel region handling process (B) consists of transferring signal electric charges in the vertical shift register VR1 to VRn of each column fed from a front optically black pixel region (the first to seventh lines) to the horizontal shift register HR.

The photosensitive pixel region handling process (C) consists of reading signal electric charges on the vertical shift register VR1 to VRn of each column fed from the photosensitive pixel region (the 8th to 67th lines) to an external circuit by appropriately linking the transfer of the vertical shift register VR1 to VRn of each column with the transfer of horizontal shift register HR.

The back optically black pixel region handling process (D) consists of transferring signal electric charges in the vertical shift register VR1 to VRn of each column fed from a back optically black pixel region (the 68th to 788th lines) to the horizontal shift register HR.

The front optically black pixel region handling process (B) in this case includes the action of performing vertical transfer of seven consecutive stages during a horizontal interval. The vertical transfer of seven consecutive stages during a horizontal interval is performed while the transfer of the horizontal shift register is being suspended (see FIGS. 11 and 12).

The photosensitive pixel region handling process (C) in this example comprises the actions of performing two stages of consecutive vertical transfer and performing consecutive horizontal transfer of a number of stages corresponding to the number of pixels in a horizontal line one after the other in a time shift within a horizontal interval. As will be discussed hereinafter, in this example, the two stages of consecutive vertical transfer are performed during a horizontal blanking interval (see FIGS. 11 and 13).

An exemplary transfer protocol table (stored in the register 109 which is described hereinafter) used in the first method for reading an image at high speed is shown in FIG. 8. As shown in the drawing, this transfer protocol table lists the transfer line number in the corresponding horizontal interval and the value of the output present/absent signal in the form of transfer line number signals L1 and L2 in association with a horizontal interval counter value indicating the particular horizontal interval.

In this example, the video signal corresponding to the front optically black pixel region is transferred for seven consecutive lines during the first horizontal interval and the video signal corresponding to the following photosensitive pixel region is transferred by two consecutive lines during each single horizontal interval. Thus, the transfer line number during the first horizontal interval is seven (L1, L2 =1, 1), and the transfer line number during the second to 31st horizontal lines is two (L1, L2 =1, 0). As for the presence and absence of an output by a horizontal transfer, it is "no" (OE=0) during the first horizontal interval and "yes" (OE=1) during the second to 31st horizontal lines.

Figure 10:
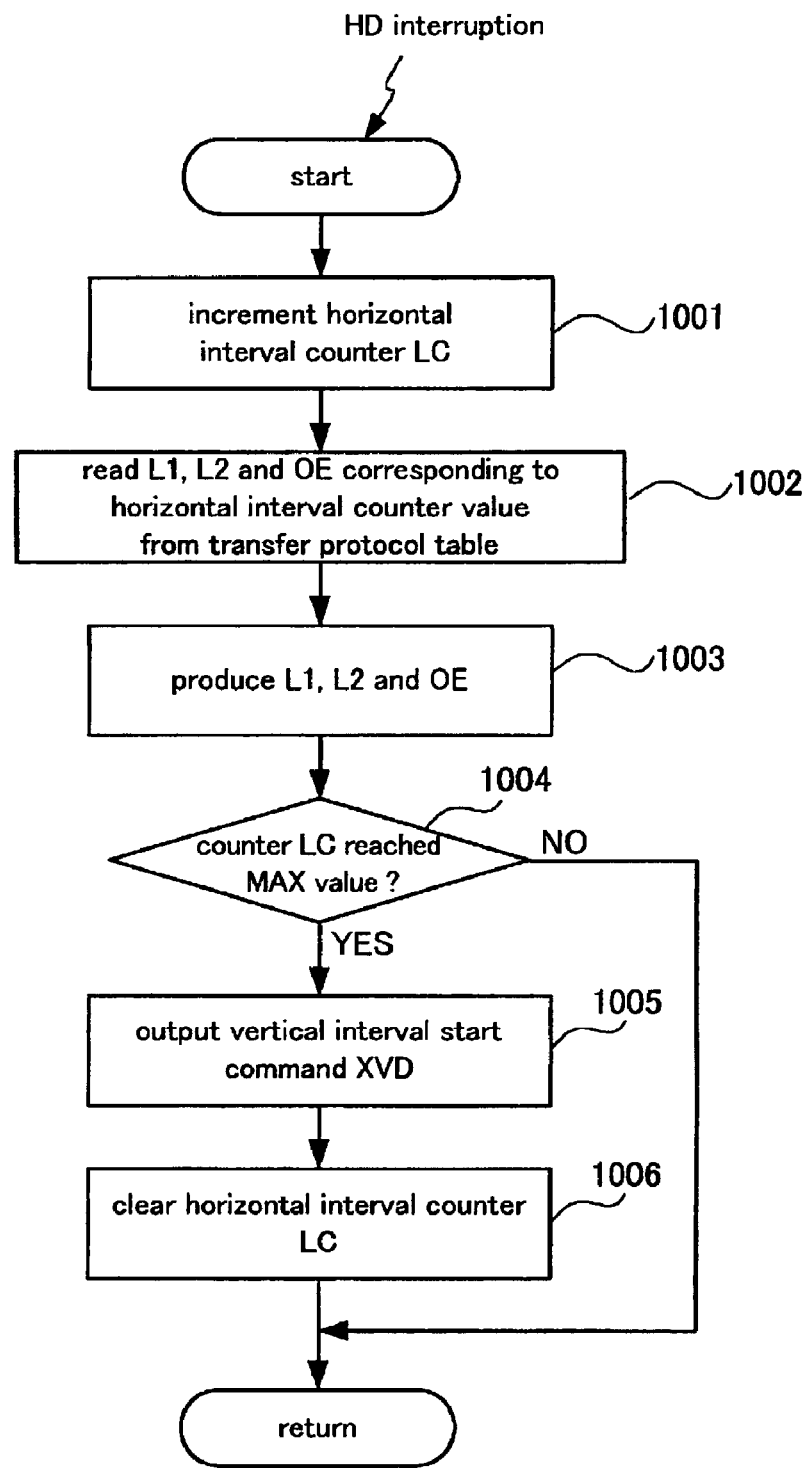
FIG. 10 is a flowchart showing the operation of the transfer control unit.

The transfer control unit (which is shown in the flowchart of FIG. 10) reads the values of the transfer line number signals L1 and L2 and output present/absent signal that are listed in the transfer protocol table, and set the values of the transfer line number signals L1 and L2 and output present/absent signal to proper levels according to their set values before forwarding them to the transfer pulse generating unit 2. The transfer pulse generating unit 2 determines the output timing of the first transfer pulse (or, in other words, produces the transfer pulse TP1 at the interval of 31/788 of the vertical interval of the video standard) according to the MAX value ("31" in FIG. 8) of the horizontal interval counter listed in the transfer protocol table.

The transfer pulse generating unit 2 determines how many times the second transfer pulse TP2 should be produced and the presence or absence of the third transfer pulse TP3 according to the values of the transfer line number signals L1 and L2 and output present/absent signal given by the transfer control unit during each horizontal interval, and thereby performs a series of control actions for the CCD imaging device 205.

The sensor main unit 100 (see FIG. 1) is adapted to determine the transfer line numbers and the values representing the presence or absence of outputs in the transfer protocol table as required via the register 109.

The outline of the transfer control process executed in the transfer control unit is shown in the flowchart of FIG. 10. This transfer control process is invoked in response to the arrival of a horizontal interval start signal HD (see FIG. 11) from the transfer pulse generating unit 2. The subsequent series of actions are cyclically repeated according to the value of the horizontal interval counter LC incorporated in the transfer control unit.

Suppose that the horizontal interval counter LC has been cleared. When the horizontal interval start signal HD arrives under this condition, the process shown in FIG. 10 is started, and the value of the horizontal interval counter LC is incremented from "0" to "1" (step 1001).

When the value of the horizontal interval counter LC changes to "1", the transfer protocol table is looked up using this counter value "1" as an index, and this allows the transfer line number signals L1 and L2 and the value of the output present/absent signal to be read. As can be seen from the conversion table of FIG. 9, the transfer line number is "7", and the external output by horizontal transfer is "no" or absent (step 1002).

Figure 11:
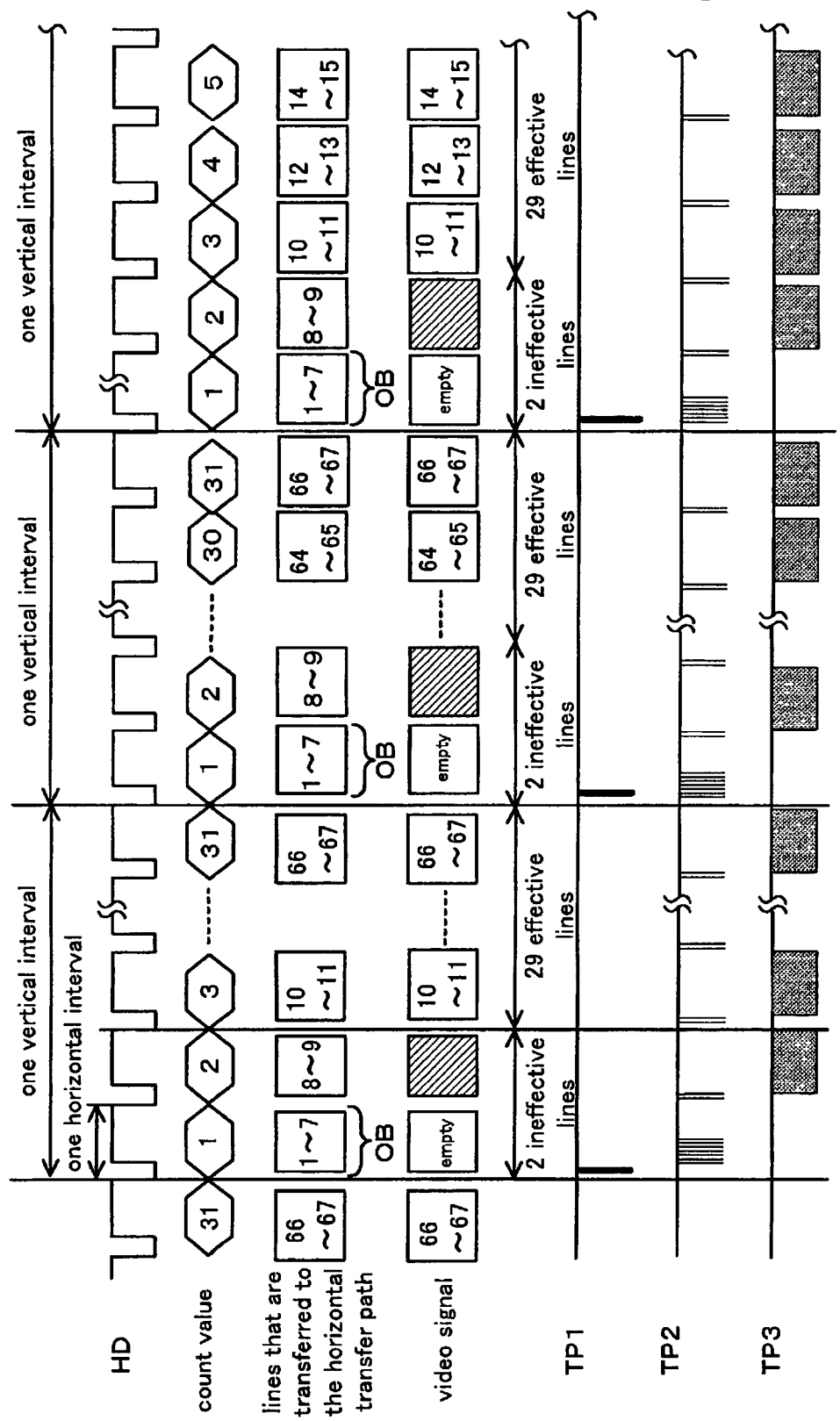
FIG. 11 is a time chart showing the drive mode of the imaging device (first method for reading an image at high speed)
Figure 12:
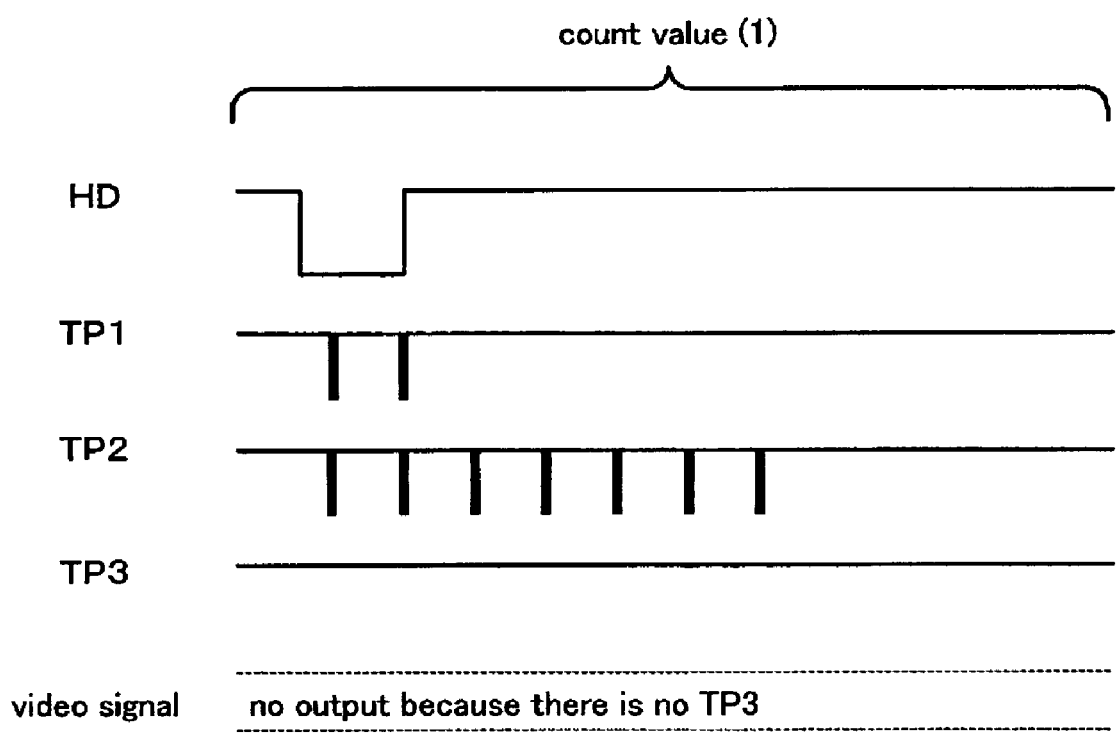
FIG. 12 is a view showing a part of the time chart of FIG. 11.

According to the contents of the values looked up from the transfer protocol table, the values of the transfer line number signals L1 and L2 and output present/absent signal are set as L1=1, L2=1 and OE=0 (step 1003). As a result, as illustrated in FIGS. 11 and 12, during the first horizontal interval corresponding to the counter value of "1", only the second transfer pulse TP2 for vertical transfer is produced from the transfer pulse generating units 2 for seven consecutive times without the third pulse TP3 for horizontal pulse being produced. As a result, no output is fed to the video signal (empty state), but electric charges worth seven lines ranging from the first to seventh lines are superimposed in the corresponding stages of the horizontal shift register HR. Thereafter, this process is concluded (no in step 1004), and the system awaits for the arrival of the next horizontal interval start signal HD.

When the second horizontal interval start signal HD arrives, the process shown in FIG. 10 is started, and the value of the horizontal interval counter LC is incremented from "1" to "2" (step 1001).

When the value of the horizontal interval counter LC changes to "2", the transfer protocol table is looked up using this counter value "2" as an index, and this allows the transfer line number signals L1 and L2 and the value of the output present/absent signal to be read. As can be seen from the conversion table of FIG. 8, the transfer line number is "2", and the external output by horizontal transfer is "yes" or present (step 1002).

Figure 13:
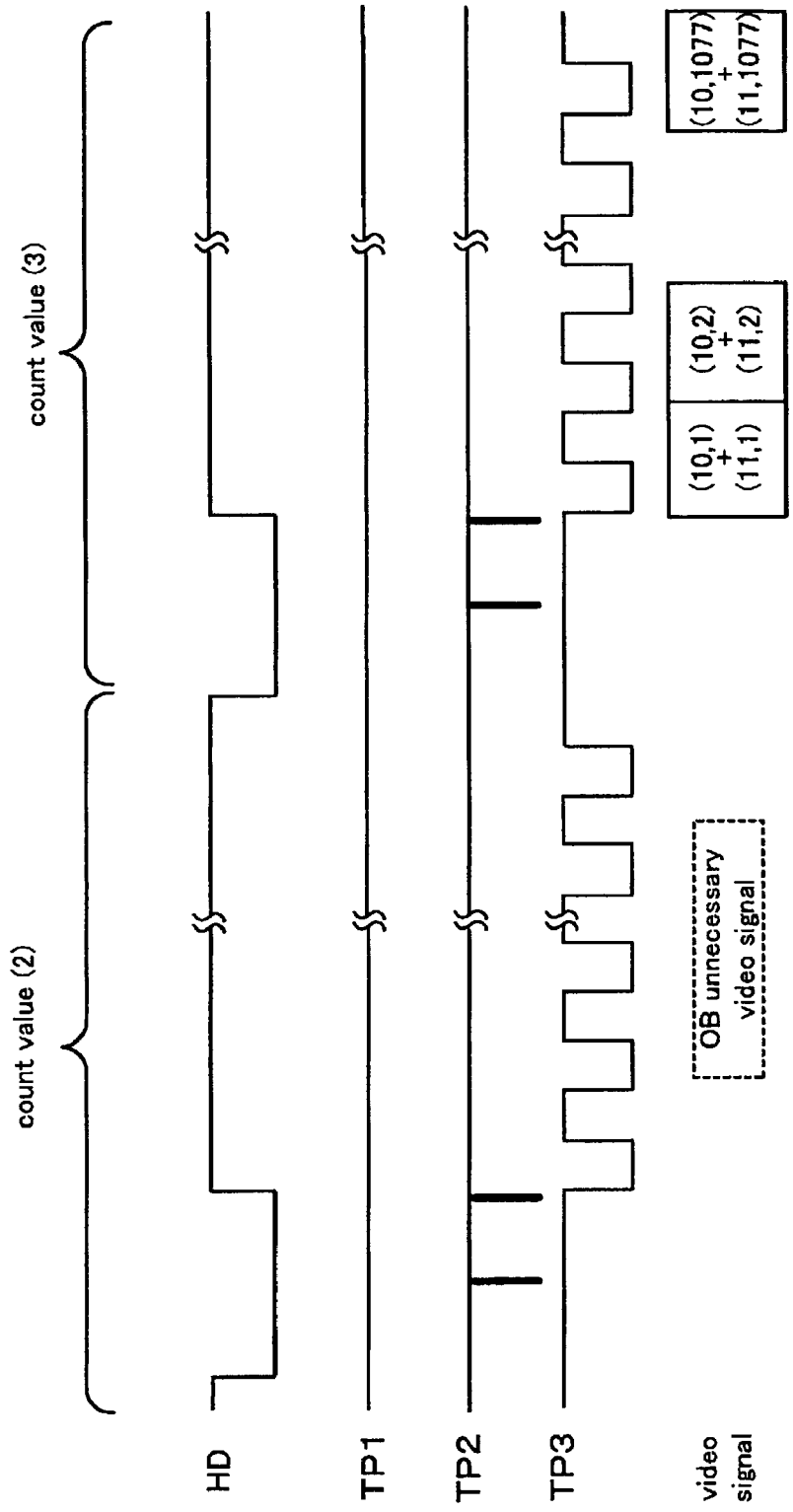
FIG. 13 is a view showing a part of the time chart of FIG. 11.

According to the contents of the values looked up from the transfer protocol table, the values of the transfer line number signals L1 and L2 and output present/absent signal are set as L1=0, L2=1 and OE=1 (step 803). As a result, as illustrated in FIGS. 11 and 13, during the second horizontal interval corresponding to the counter value of "2", the second transfer pulse TP2 for vertical transfer is produced from the transfer pulse generating units 2 for two consecutive times during the horizontal blanking interval and, after completion of the horizontal blanking interval the third pulse TP3 for horizontal transfer is produced for a number of times corresponding to the number of pixels in the horizontal line.

When the second transfer pulse TP2 is produced twice during the horizontal blanking interval, electric charges for the two lines or eighth and ninth lines are transferred on top of the electric charges of the seven lines ranging from the first to seventh lines that are already stored in the corresponding stages of the horizontal shift register HR, and electric charges worth the nine lines ranging from the first to ninth lines are superimposed one over the other. Thereafter, when the third transfer pulse TP3 for horizontal transfer is produced by the number corresponding to the number of pixels in the horizontal line, the electric charges worth the nine superimposed lines are put into the video signal. The electric charges worth these nine superimposed lines become an OB unnecessary part of the video signal which is indicated by hatching in FIG. 11 and surrounded by dotted lines in FIG. 13. As a result, the first two lines of the video signal become an ineffective image part. Thereafter, the process is concluded (no in step 1004), and the system waits for the arrival of the next horizontal interval start signal HD.

When the third horizontal interval start signal HD arrives, the process shown in FIG. 10 is started, and the value of the horizontal interval counter LC is incremented from "2" to "3" (step 1001).

When the value of the horizontal interval counter LC changes to "3", the transfer protocol table is looked up using this counter value "3" as an index, and this allows the transfer line number signals L1 and L2 and the value of the output present/absent signal to be read. As can be seen from the conversion table of FIG. 9, the transfer line number is "2" again, and the external output by horizontal transfer is "yes" or present (step 1002).

According to the contents of the values looked up from the transfer protocol table, the values of the transfer line number signals L1 and L2 and output present/absent signal are set as L1=0, L2=1 and OE=1 (step 1003). As a result, as illustrated in FIGS. 11 and 13, during the third horizontal interval corresponding to the counter value of "3", the second transfer pulse TP2 for vertical transfer is produced from the transfer pulse generating units 2 for two consecutive times during the horizontal blanking interval and, after completion of the horizontal blanking interval, the third pulse TP3 for horizontal transfer is produced for a number of times corresponding to the number of pixels in the horizontal line.

When the second transfer pulse TP2 is produced twice during the horizontal blanking interval, electric charges for the two lines or 10th and 11th lines are transferred onto the corresponding stages of the horizontal shift register HR which are empty. At this time, although electric charges worth two lines are superimposed one over the other, the electric charges of each stage in the horizontal shift register still adequately preserve the features of the original image. Thereafter, when the third transfer pulse TP3 for horizontal transfer is produced by the number corresponding to the number of pixels in the horizontal line, the electric charges worth the two superimposed lines are put into the video signal. As shown in FIGS. 11 and 13, the part of the video signal derived from the electric charges of the two superimposed 10th and 11th lines becomes an effective video signal.

Thereafter, the actions upon arrival of the fourth to 31st horizontal interval start signals HD are similar to that when the third horizontal interval start signal HD arrives. Therefore, upon arrival of the fourth to 31st horizontal start signals HD, the video signals composed of mutually superimposed 12th and 13th lines, 14th and 15th lines . . . , and 66th and 67th lines are produced one after the other as shown in FIGS. 11 and 13.

Upon arrival of the 31st horizontal interval start signal, the value of the line counter LC reaches the maximum value (yes in step 1004), and the vertical interval start command XVD is produced (step 1005) before the content of the horizontal interval counter LC is cleared to "0" (step 1006). When this vertical interval start command XVD is received, the transfer pulse generating unit 12 produces the first transfer pulse TP1 for feeding pixel electric charges, and the process which is to be performed upon receipt of each of the first to 31st horizontal interval start signals as described earlier is repeated while the signal electric charges for the 68th to 788th lines are left in the vertical shift registers VR1 to VRn.

When the second and subsequent first transfer pulses TP1 for feeding pixel electric charges are produced, signal electric charges are fed from the light receiving pixels Ph(m, n) to the vertical shift registers VR1 to VRn of the corresponding columns. At this time, each stage of each vertical shift register VR1 to VRn corresponding to the photosensitive pixel region should contain the electric charges that were transferred from the back optically black pixel region. However, because the electric charges from the back optically black pixel region are extremely small or substantially zero, even when the electric charges are superimposed on these electric charges, the degradation of the effective image due to double exposure is not appreciable. In other words, the overwriting over the electric charges from the back optically black pixel region would not create the problem of double exposure.

Therefore, according to the first method for reading an image at high speed, while the signal electric charges for the 68th to 788th lines are left in the vertical shift registers VR1 to VRn, the next shot can be taken so that the number of frames per unit time can be increased, and the high speed imaging is thereby enabled.

The image data for one frame acquired by the first method for reading an image at high speed is illustrated in FIG. 14 in the form of a table. As shown in the drawing, the two lines ranging from the first to second lines form the ineffective image, and the 29 lines ranging from the third to 31st lines form the effective image.

A concrete example of the implementation of the second method is described in the following with reference to FIGS. 15 to 17. In this example, the drive control unit (composed of the transfer pulse generating unit 2 shown in FIG. 6 and transfer control unit whose operation is illustrated in FIG. 10) repeats the signal electric charge feeding process (A), front optically black pixel handing process (B) photosensitive pixel region handling process (C) and the back optically black pixel handing process (D). Thereby, the time period required for reading out a single frame may be reduced by the time period saved by transferring signal electric charges in the vertical shift register of each column fed from the front and back optically black pixel regions at high speed.

The signal electric charge feeding process (A) consists of feeding signal electric charges from each light receiving pixel Ph(m, n) to the vertical shift register VR1 to VRn of the corresponding column at the beginning of each vertical interval.

The front optically black pixel region handling process (B) consists of transferring signal electric charges in the vertical shift register VR1 to VRn of each column fed from a front optically black pixel region to the horizontal shift register HR at high speed.

The photosensitive pixel region handling process (C) consists of reading signal electric charges on the vertical shift register VR1 to VRn of each column fed from the photosensitive pixel region to an external circuit by appropriately linking the transfer of the vertical shift register VR1 to VRn of each column with the transfer of horizontal shift register HR.

The back optically black pixel region handling process (D) consists of transferring signal electric charges in the vertical shift register VR1 to VRn of each column fed from a back optically black pixel region to the horizontal shift register HR at high speed.

The front optically black pixel region handling process (B) and/or the back optically black pixel region handling process (D) in this case includes the action of repeatedly performing vertical transfer of seven consecutive stages during one or a plurality of horizontal interval. The vertical transfer of seven consecutive stages during a horizontal interval is performed while the transfer of the horizontal shift register is being suspended (see FIG. 16).

Figure 16:
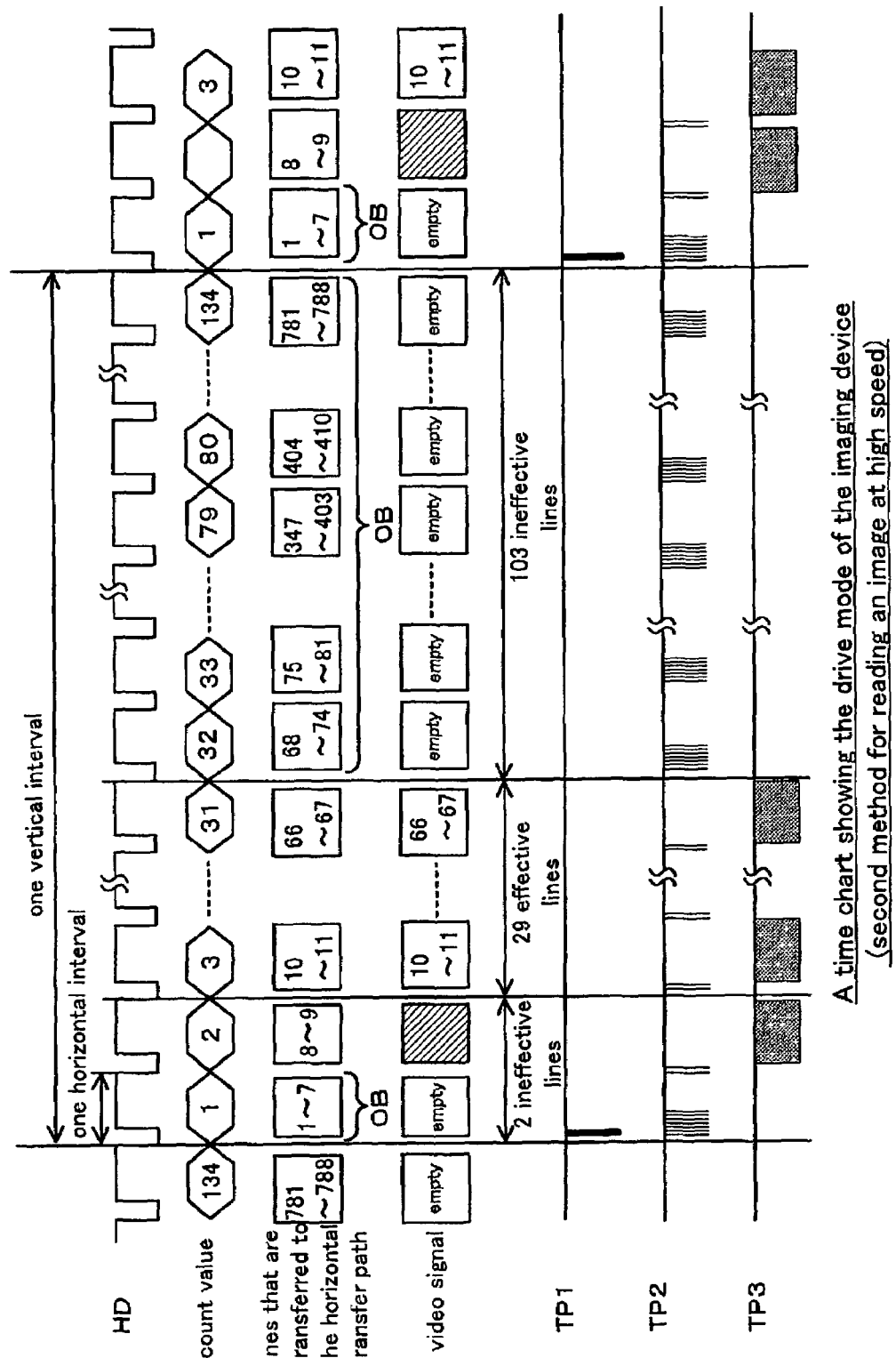
FIG. 16 is a time chart showing the exemplary drive mode of the imaging device (second method for reading an image at high speed)

The photosensitive pixel region handling process (C) in this example comprises the actions of performing two stages of consecutive vertical transfer and performing consecutive horizontal transfer of a number of stages corresponding to the number of pixels in a horizontal line one after the other in a time shift within a horizontal interval (see FIG. 16).

An exemplary transfer protocol table used in the second method for reading an image at high speed is shown in FIG. 15. As shown in the drawing, this transfer protocol table lists the transfer line number in the corresponding horizontal interval and the value of the output present/absent signal in the form of transfer line number signals L1 and L2 in association with a horizontal interval counter value indicating the particular horizontal interval.

In this example, the video signal corresponding to the front optically black pixel region is transferred by seven consecutive lines during a horizontal interval, and the video signal corresponding to the following photosensitive pixel region is transferred for two consecutive lines during each single horizontal interval and the back optically black region transferred by seven consecutive lines during a horizontal interval. Thus, the transfer line number during the first horizontal interval is seven, the transfer line number during the second to 31st horizontal lines is two, and the transfer line number during the 32nd to 134th horizontal lines is seven. As for the presence and absence of an output by a horizontal transfer, it is "no" during the first horizontal interval, "yes" during the second to 31st horizontal lines, and "no" again during the 32nd to 134th horizontal lines.

The transfer control process that is executed in the transfer control unit is essentially similar to that shown in the flowchart shown in FIG. 10. Therefore, the second method for reading an image at high speed is described in the following with reference to the same flowchart again.

The actions during the time period in which the count value of the horizontal interval counter LC is between "1" and "31" are similar to those of the first method for reading an image at high speed. In other words, during the horizontal intervals corresponding to the counter values of "1" and "2" (mostly in the front optically black pixel region), the electric charges for the two lines ranging from the eighth to ninth lines are written over the electric charges derived from the seven lines ranging from the first to seventh lines stored in the respective stages of the horizontal shift register. Therefore, the electric charges of the nine lines ranging from the first to ninth lines are superimposed one over the other, and are sent out during the vertical interval when the count value of the video signal is "2". The part of the video signal corresponding to the superimposed electric charges of the nine lines become an OB unnecessary video signal so that the first two lines of the video signal become an ineffective image part (see count values "1" and "2" in FIG. 16).

During the third to 31st horizontal intervals corresponding to the counter values of "3" to "31" (mostly in the photosensitive pixel region), the video signals composed of mutually superimposed 10th and 11th, 12th and 13th lines, 14th and 15th lines . . . , and 66th and 67th lines are produced one after the other. The superimposed electric charges of these pairs of lines become ineffective image parts (see count values "3" to "31" in FIG. 16).

During the 32nd to 134th horizontal intervals corresponding to the counter values of "32" to "134" (mostly in the back optically black pixel region), the transfer pulse generating unit 12 generates the second transfer pulse TP2 for vertical transfer twice during the horizontal blanking interval, however, after the completion of the horizontal blanking interval, the third transfer pulse T3 for horizontal transfer is not produced. As a result, nothing is produced in the video signal (see count values "32" to "134" in FIG. 16).

The image data for one frame acquired by the second method for reading an image at high speed is illustrated in FIG. 17 in the form of a table. As shown in the drawing, the two lines ranging from the first to second lines form the front ineffective image, the 29 lines ranging from the third to 31st lines form the effective image, and the 103 lines ranging from the 32nd to 134th lines form the rear ineffective image.

The basic pixel layout pattern for the CCD imaging device 205 forming the sensor head unit 200 described above may be simply based on the pixel arrangement of a low-end CCD imaging device which corresponds to the aspect ratio of a common digital still camera. Therefore, there is no need to newly design a special pixel layout pattern, and this contributes to the reduction in time and cost for the development, and the device can be offered at low cost.

The contents of the image processing in the sensor main unit 100 is described in the following with reference to FIG. 1. The sensor main unit 100 comprises a CPU 101 consisting of a one-chip microcomputer, a display LED 102, an operating switch 103, input/output (I/O) circuit 104, a computing unit 105, a memory control unit 106, a frame buffer 107, a D/A converter 108, a register 109, a synchronization signal generating unit 110 and an oscillator (OSC) 111. BUS1 denotes a synchronization bus, and BUS2 denotes a CPU bus.

The CPU 101 consisting of a one-chip microcomputer generally controls the sensor main unit 101. The computing unit 105 consists of a hardware circuit for performing various arithmetic computations necessary for the image processing, and performs various processes on the image data that is fed thereto via the A/D converter 112. The image which has been processed here is stored in the frame buffer 107 via the memory control unit 106, and is forwarded to an external CRT display or the like via the D/A converter 108 as an NTSC image if necessary. The register 109 stores a transfer protocol table that is required for the operation of the sensor head unit 200. The contents of the transfer protocol table define the values of L1, L2 and OE in relation with each horizontal line count value as described earlier in connection with FIGS. 8 and 15. The display LED 102 externally indicates the operating state of the sensor main unit 100, and the operation switch 103 provides various commands for the sensor main unit 100. The input/output (I/O) circuit 104 externally forwards the displacement data measured by the sensor main unit 100. The displacement data includes a switching signal indicating the result of a comparison of the measured value with a reference value in addition to the measured value itself. The operation of the sensor main unit 100 is controlled by a synchronization signal produced from the oscillator (OSC) 111 and synchronization signal generating unit 110.

Various measurement processes by using the displacement sensor 1 described above are now described in the following in terms of concrete examples.

Figure 18:
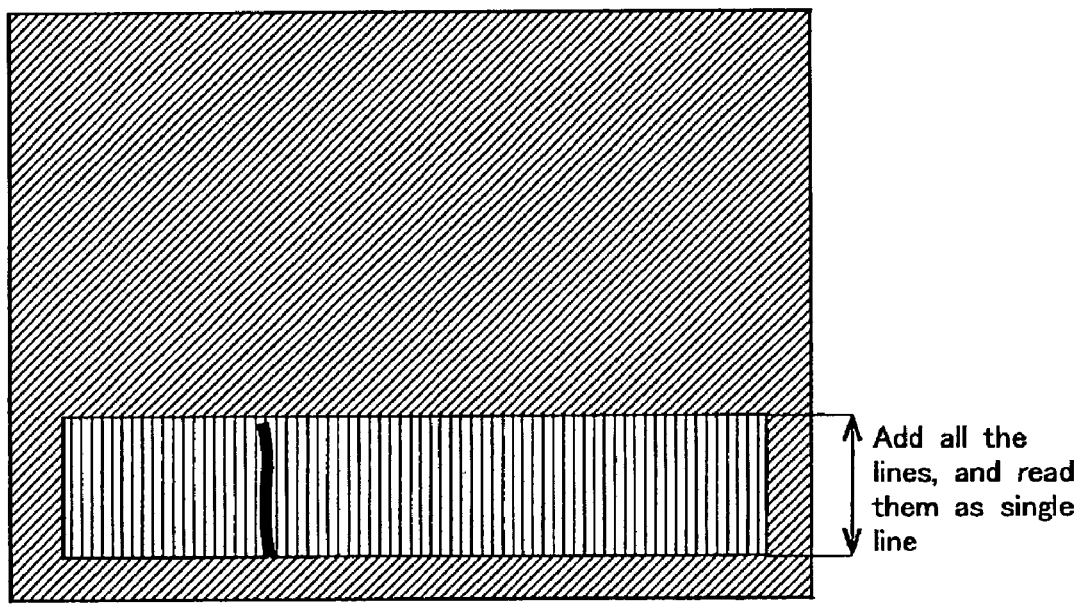
FIG. 18 is a schematic diagram illustrating the entire line comprehensive averaging process which is performed in the imaging device.
Figure 20:
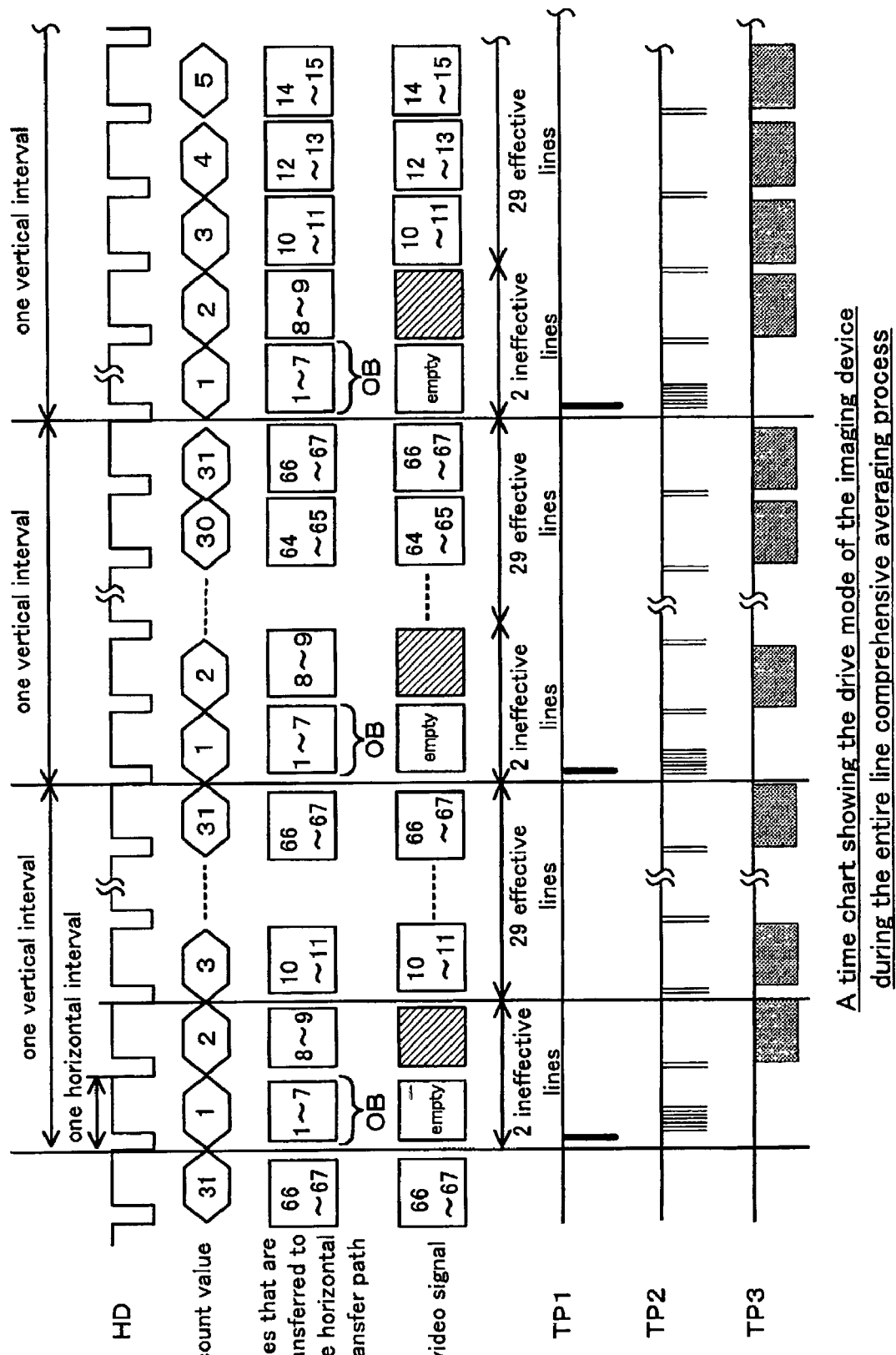
FIG. 20 is a time chart showing the exemplary drive mode of the imaging device during the entire line comprehensive averaging process.

A measurement of a height of a metallic plate having a hairline pattern on its surface is described in the following with reference to FIGS. 18 to 21. In this case, as shown in FIG. 18, an entire line comprehensive averaging process is executed. The contents of the transfer protocol table in such a case are shown in FIG. 19, and a drive mode of the imaging device is shown in FIG. 20. As shown in FIG. 19, the number of transfer stages is "7" when the horizontal counter value is "1", and the number of transfer stages is "2" when the horizontal counter value is "2" to "31". When the horizontal counter value is "1" to "31", there is "no" horizontal transfer. Based on such a transfer protocol table, the process shown in FIG. 10 described earlier is executed with a result of summation result of the electric charges of 29 lines is produced for each vertical interval as shown in FIG. 20. As a result, when the measurement object has hairlines on its surface as shown in FIG. 21(a), A zigzag shaped line beam appears on the surface of the object as a light image of the sectional light beam as shown in FIG. 21(b). As shown in FIG. 21(c), on the light receiving surface of the imaging device, such data is averaged by an area effect, and an accurate measurement is enabled by reducing the influences of the hairlines. Thus, according to the present invention, instead of reading data line by line from the imaging device and averaging them in a memory device, the data is averaged within the CCD device by combining the multiple stage vertical transfer operation and horizontal transfer suspension process in the CCD so that the averaging process can be executed at high speed and the need for an external averaging computing circuit is eliminated.

Various measurements based on the image processing units performed in the memory device on the data read from the CCD imaging device are described in the following. In these measurement also, the contents of the transfer protocol table stored in the register 109 are appropriately replaced depending on the kinds of measurement.

A measurement process for measuring a flaw is described in the following with reference to FIG. 23. When an object having a flaw on its surface is imaged by the sensor head unit as shown in FIG. 23(a), a line beam consisting of a wavy bright line corresponding to the depth of the flaw appears on the surface of the object as shown in FIG. 23(b). Therefore, by detecting the height of each measurement line as shown in FIG. 23(c), a P—P (peak to peak) level is obtained. Alternatively, the variance of the heights of the measurement lines may also be obtained By so doing, the width and/or depth of such a flaw can be obtained as a measurement value.

A measurement process for measuring a projection is described in the following with reference to FIG. 24. When an object having a projection on its surface is imaged by the sensor head unit as shown in FIG. 24(a), a line beam consisting of an arcuate bright line corresponding to the height of the projection appears on the surface of the object as shown in FIG. 24(b). Therefore, by detecting the height of each measurement line as shown in FIG. 24(c), a p—p (peak to peak) is obtained. By so doing, the height of such a projection can be obtained as a measurement value.

A measurement process for measuring a groove is described in the following with reference to FIG. 25. When an object having a groove on its surface is imaged by the sensor head unit as shown in FIG. 25(a), a line beam consisting of a V-shaped bright line corresponding to the depth of the groove appears on the surface of the object as shown in FIG. 25(b). Therefore, by detecting the height of each measurement line as shown in FIG. 25(c), a bottom is obtained. By so doing, the depth of such a groove can be obtained as a measurement value.

A measurement process for measuring an inclination is described in the following with reference to FIG. 26. When an object having an inclination on its surface is imaged by the sensor head unit from above as shown in FIG. 26(a), a line beam consisting of a bright line having an inclination angle theta (θ) appears on the surface of the object as shown in FIG. 26(b). Therefore, by detecting the height of each measurement line and finding the inclination angle as shown in FIG. 26(c), an inclination angle of the surface of the object is obtained. By so doing, it is also possible to check the mounted state of the sensor.

A measurement process for measuring a coplanarity (evenness in height) is described in the following with reference to FIG. 27. When an object having a BGA (ball grid array) on its surface is imaged by the sensor head unit from above as shown in FIG. 27(a), a line beam consisting of a semicircular bright line appears on the surface of the object as shown in FIG. 27(b). Therefore, by computing the height of each measurement line and finding a peak while moving the object as shown in FIG. 27(c), a coplanarity of the BGA or how even the heights of the individual balls are can be measured.

Figure 22:
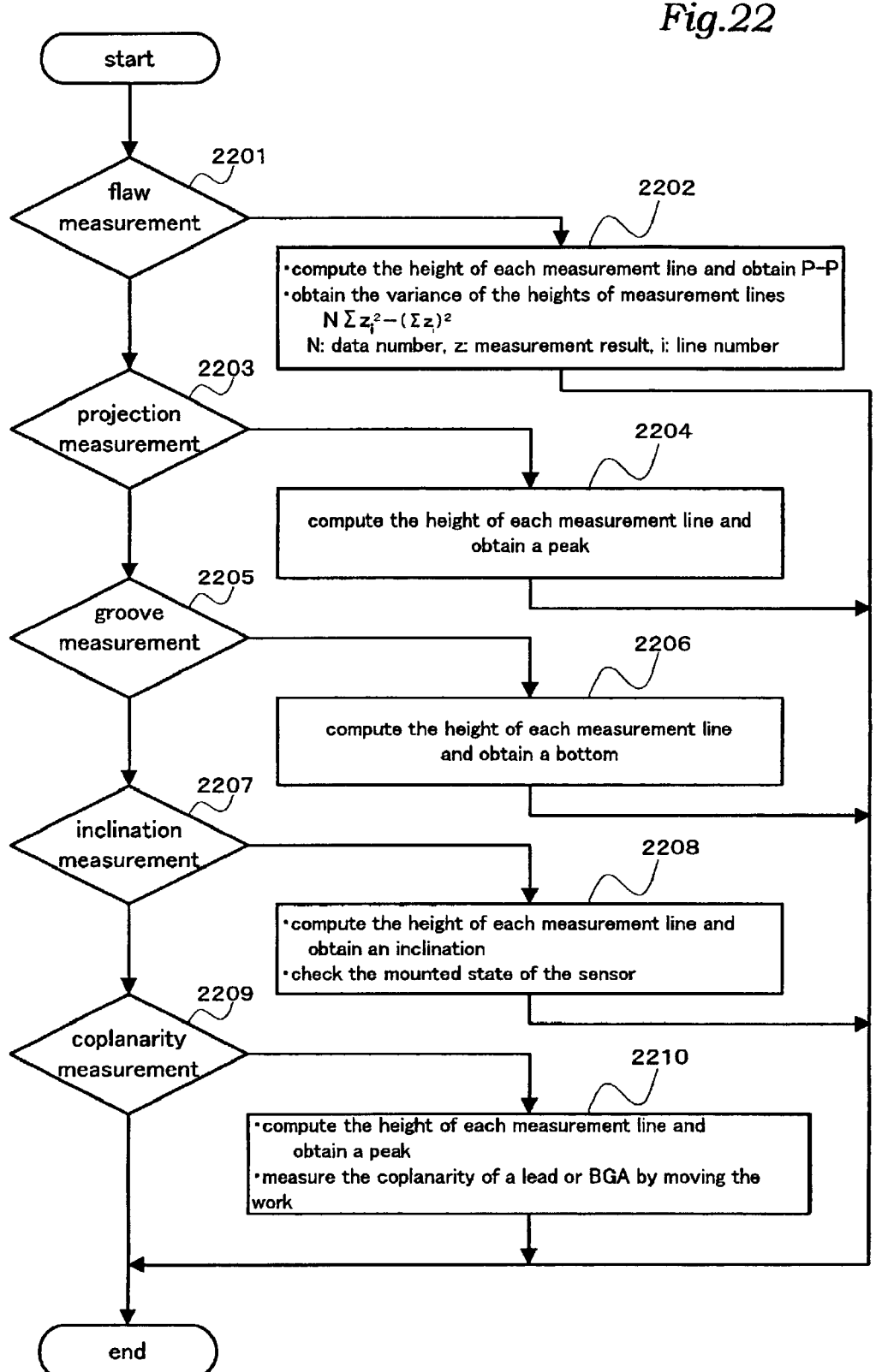
FIG. 22 is a flowchart showing the overall image processing that is performed in the sensor main unit.
Figure 28:
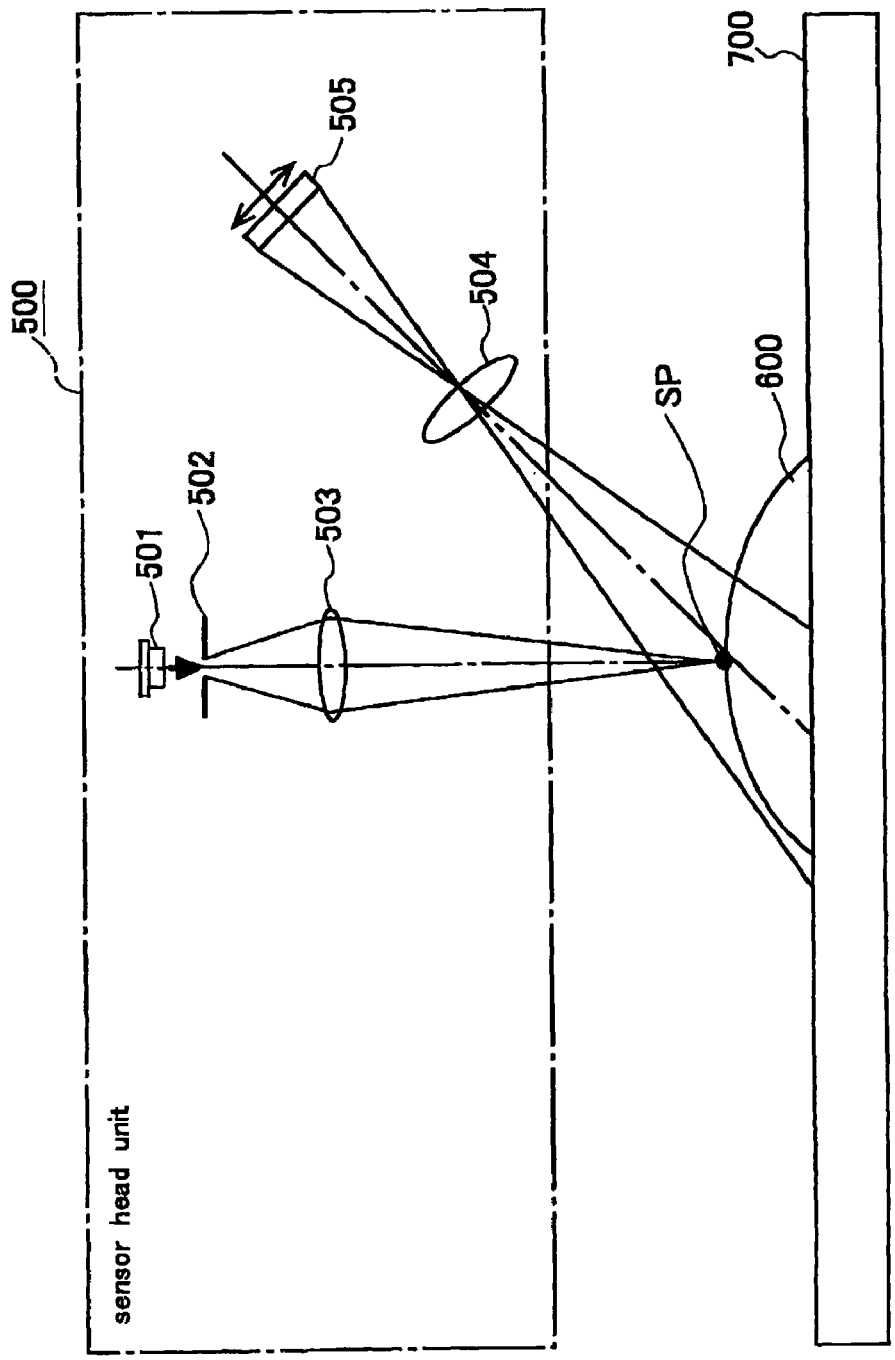
FIG. 28 is a diagram showing the optical system of the sensor head unit of a conventional displacement sensor.
Figure 29:
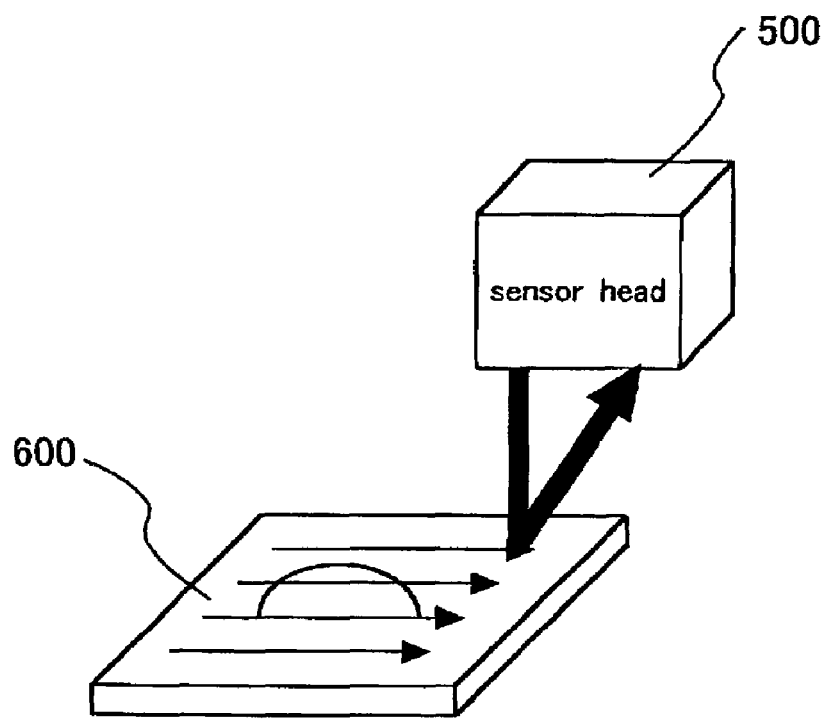
FIG. 29 is a schematic diagram showing the mode of measuring a region using the conventional sensor.
Figure 30:
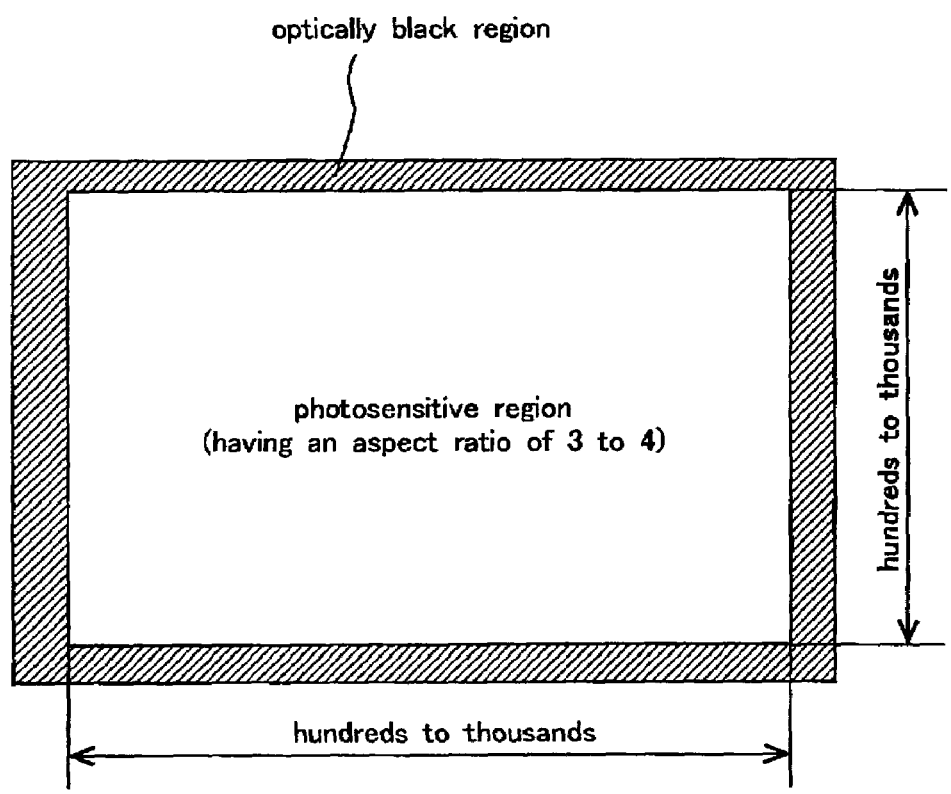
FIG. 30 is a diagram showing the photosensitive pixel region of a conventional two dimensional CCD.

The relationship between the processes described above and the measurement objects is summarized in the flowchart of FIG. 22. As shown in this drawing, when measuring a flaw (yes in step 2201), the height of each measurement line is computed, and P-P is determined. Alternatively, the variance of the heights of measurement lines is obtained (step 2202).

When measuring a projection (yes in step 2203), the height of each measurement line is computed, and a peak is determined (step 2204).

When measuring a groove (yes in step 2205), the height of each measurement line is computed, and a bottom is determined (step 2206).

When measuring an inclination (yes in step 2207), the height of each measurement line is computed, and an inclination is determined (step 2208).

When measuring a coplanarity (yes in step 2209), the height of each measurement line is computed, and a peak is determined. The coplanarity of a lead, BGA or the like can be measured as the work is moved (step 2210).

From a different view point, it is possible to find that the foregoing embodiments give rise to an aspect of the present invention that may be expressed in the forms of the first and second imaging units and the first and second visual measurement device defined in the following.

More specifically, the first imaging unit comprises a two dimensional imaging device including a group of light receiving pixels arranged in a matrix so as to correspond to a field of view of a standard imaging unit, a plurality of vertical shift registers corresponding to different columns of the pixels, and a horizontal register for receiving the outputs of the vertical shift registers in a single body or in a parallel relationship, a photosensitive pixel region being defined in a prescribed horizontal band having a sufficiently narrower width than that would be provided by the total number of horizontal lines and surrounded by an optically black pixel region, and a drive control unit for controlling a feeding of signal electric charges from each pixel to the vertical shift register of a corresponding column, a vertical transfer of signal electric charges in the vertical shift register of each column, and a horizontal transfer of signal electric charges in the horizontal shift register.

The drive control unit is configured in such a manner that a signal electric charge feeding process for feeding signal electric charges from each light receiving pixel to the vertical shift register of the corresponding column at the beginning of each vertical interval, a front optically black pixel region handling process for transferring signal electric charges in the vertical shift register of each column fed from a front optically black pixel region to the horizontal shift register, and a photosensitive pixel region handling process for reading signal electric charges on the vertical shift register of each column fed from the photosensitive pixel region to an external circuit by appropriately linking the transfer of the vertical shift register of each column with the transfer of horizontal shift register are repeatedly executed without performing a back optically black pixel region handling process for transferring signal electric charges in the vertical shift register of each column fed from a back optically black pixel region to the horizontal shift register, so that the time period required for reading out a single frame may be reduced by the time period saved by not performing the back optically black pixel region handling process.

The first visual measurement device comprises such a first imaging unit and an image processing unit for performing a prescribed image processing according to image data received from the first imaging unit.

The second imaging unit comprises a two dimensional imaging device including a group of light receiving pixels arranged in a matrix so as to correspond to a field of view of a standard imaging unit, a plurality of vertical shift registers corresponding to different columns of the pixels, and a horizontal register for receiving the outputs of the vertical shift registers in a single body or in a parallel relationship, a photosensitive pixel region being defined in a prescribed horizontal band having a sufficiently narrower width than that would be provided by the total number of horizontal lines and surrounded by an optically black pixel region, and a drive control unit for controlling a feeding of signal electric charges from each pixel to the vertical shift register of a corresponding column, a vertical transfer of signal electric charges in the vertical shift register of each column, and a horizontal transfer of signal electric charges in the horizontal shift register.

The drive control unit is configured in such a manner that a signal electric charge feeding process for feeding signal electric charges from each light receiving pixel to the vertical shift register of the corresponding column at the beginning of each vertical interval, a front optically black pixel region handling process for transferring signal electric charges in the vertical shift register of each column fed from a front optically black pixel region to the horizontal shift register at high speed, a photosensitive pixel region handling process for reading signal electric charges on the vertical shift register of each column fed from the photosensitive pixel region to an external circuit by appropriately linking the transfer of the vertical shift register of each column with the transfer of horizontal shift register, and a back optically black pixel region handling process for transferring signal electric charges in the vertical shift register of each column fed from a back optically black pixel region to the horizontal shift register at high speed are repeatedly executed, so that the time period required for reading out a single frame may be reduced by the time period saved by transferring signal electric charges in the vertical shift register of each column fed from the front and back optically black pixel regions at high speed.

The second visual measurement device comprises such a second imaging unit and an image processing unit for performing a prescribed image processing according to image data received from the second imaging unit.

The "visual measurement device" as used herein generally means any measurement device, such as a displacement sensor, 3-D sensor, length sensor or bar code reader using a light section method, which uses a two dimensional imaging device as a light receiving device. The feature of the two dimensional imaging device discussed here that it is capable of high speed imaging while ensuring a high level of resolution in the lengthwise direction of an elongated field of view is very advantageous also in the applications to different visual measurement devices other than a displacement sensor. A 3-D sensor measures the three dimensional features on the surface of a measurement object by using a displacement sensor based on a light section method to acquire height information of various parts while moving the measurement object in a direction perpendicular to the lengthwise direction of the slit beam of the displacement sensor relative to the displacement sensor. A length sensor forms a slit beam consisting of parallel beams, and impinges this slit beam onto a light receiving surface of a two dimensional imaging device. When a measurement object blocks a part of the slit beam, the length of the part of the measurement object which has blocked the slit beam is measured from the length of the shadow region formed on the light receiving surface.

Figure 32:
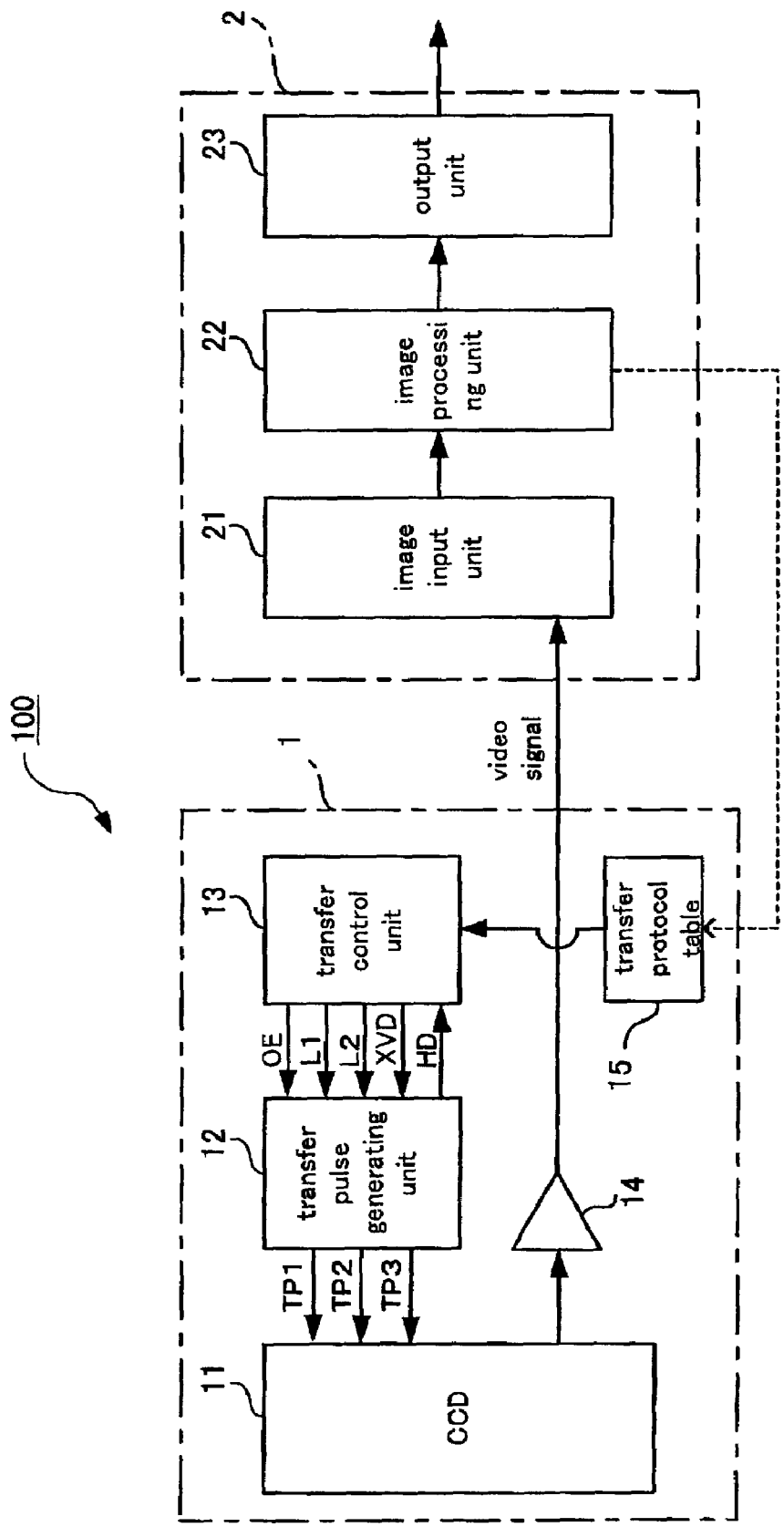
FIG. 32 is a block diagram showing the structure of the visual measurement device.

FIG. 32 is a block diagram showing an electric hardware structure of a visual measurement device (such as a displacement sensor, 3-D sensor or the like using a light section method) embodying the present invention.

As shown in the drawing, the visual measurement device 800 essentially consists of an imaging unit 7 for producing a video signal of a two dimensional image, and an image processing unit 8 for receiving the video signal from the imaging unit 7 and performing an image process necessary for the measurement.

The imaging unit 7 comprises a CCD imaging device 71 (which is abbreviated as "CCD" in the drawing) as a solid state imaging device, a transfer pulse generating unit 72, a transfer control unit 73, an output buffer 74 and a transfer protocol table 75. The drive control unit is comprised of the transfer pulse generating unit 72, transfer control unit 73 and transfer protocol table 75.

The image processing unit 8 comprises an image input unit 81 for A/D converting the video image from the imaging unit 7, an image processing main unit 82 for performing an image process for prescribed measurement by using a digital image obtained by the conversion process in the image input unit, and an output unit 83 for sending out the result of this image process to an external circuit.

When the image data formed in the imaging unit 7 is fed into the image processing unit 8, the image processing unit 82 extracts an object in the image by using a technique such as a binary value process and edge extraction process, and the characteristic values such as an area, gravitational center or the like are measured with respect to the extracted object. The specific contents of the characteristic values for the measurement process depend on the exact configurations of the visual measurement device which may be in the form of a displacement sensor, 3-D sensor, length sensor or bar code reader.

When the first method for reading an image at high speed (see FIGS. 11 and 14) is adopted by the imaging unit 7, the image data for each frame is acquired in about one 25th of the normal time period that is required for doing it, and the dramatic reduction in the time period required for inputting image improves the process efficiency. Furthermore, because the electric charges would not saturate in the horizontal shift register HR, there is no fear of degradation of the image in the effective image region due to smears or like that could be caused by the saturation of electric charges. As for the effective image region which requires a detailed process, the acquired image data has a resolution comparable to that of image data produced according to the standard video standard, and the precision of the measurement process can be ensured.

Thereafter, the measurement result is compared with a prescribed reference value to determine the acceptability of the object if necessary. The measurement result or determination result is sent out to an external device such as a monitor via the output unit 83.

When the second method for reading an image at high speed (see FIGS. 15 and 17) is adopted by the imaging unit 7, the image data for each frame is acquired in about one fifth of the normal time period that is required for doing it, and the dramatic reduction in the time period required for inputting image improves the process efficiency. Furthermore, because the electric charges would not saturate in the horizontal shift register HR from electric charges from the optically black region, there is no fear of degradation of the image in the effective image region due to smears or like that could be caused by the saturation of electric charges. As for the effective image region which requires a detailed process, the acquired image data has a resolution comparable to that of image data produced according to the standard video standard, and the precision of the measurement process can be ensured.

Thereafter, the measurement result is compared with a prescribed reference value to determine the acceptability of the object if necessary. The measurement result or determination result is sent out to an external device such as a monitor via the output unit 83.

The basic pixel layout pattern for the CCD imaging device 71 forming the imaging unit 7 described above may be simply based on the pixel arrangement of a low-end CCD imaging device which corresponds to the aspect ratio of a common digital still camera Therefore, there is no need to newly design a special pixel layout pattern, and this contributes to the reduction in time and cost for the development, and the device can be offered at low cost.

Favorable applications of such a CCD imaging device include displacement sensors, 3-D sensors, length sensors and bar code readers using a light section method as a detection principle. The field of view of such sensors is typically elongated and a high resolution is required in the lengthwise direction. If a certain level of resolution is given also in the perpendicular direction, the visual identification of the measurement light beam and the object image is made possible. In such a CCD imaging device, the resolution power of 1,034 pixels can be achieved in the lengthwise direction which is important for the displacement measurement, and the resolution power of up to 60 pixels can be achieved in the widthwise direction.

As can be appreciated from the foregoing description, according to the imaging unit of the present invention, the elongated field of view can be imaged at high speed without any degradation of the image quality and the unit can be manufactured at low cost. Therefore, according to the present invention, image data can be acquired from the elongated field of view at a desired resolution at high speed, and a measurement process can be performed in a highly responsive manner. The present invention additionally provides a visual measurement device (such as a displacement sensor, 3-D sensor, length sensor or bar code reader using a light section method) that can be manufactured at low cost.

From another different view point, it is possible to find that the foregoing embodiments give rise to another aspect of the present invention that may be expressed in the forms of the two dimensional imaging device and the CCD imaging device defined in the following.

More specifically, the two dimensional imaging device of the present invention may comprise a group of pixels arranged in a matrix so as to correspond to a field of view of a standard imaging unit, a plurality of vertical shift registers for transferring an output of each pixel belonging to the pixel group in a vertical direction in a corresponding column of the matrix, and a horizontal register for transferring electric charges that have been transferred from the vertical shift registers in a horizontal direction to send them out to an external circuit, the transfer actions of the vertical shift registers and horizontal register being controllable from outside.

The pixel group which is arranged in a matrix may comprise a first subgroup consisting of pixels belonging to a prescribed horizontal band consisting of a number of horizontal lines that is sufficiently smaller than the total number of horizontal lines, and a second subgroup consisting of pixels not belonging to the prescribed horizontal band, and all or most of the pixels forming the first subgroup consist of photosensitive pixels while all or most of the pixels forming the second subgroup consist of optically black pixels.

Preferably, those pixels belonging to the first subgroup located adjacent to horizontal terminal ends of the prescribed horizontal band consist of optically black pixels while the pixels interposed between these two terminal pixel groups consist of photosensitive pixels, and all of the pixels of the second subgroup not belonging to the prescribed horizontal band consist of optically black pixels.

Preferably, the pixels are arranged so as to correspond to the field of view of a digital still camera, normal TV camera or HD TV camera.

The CCD imaging device of the present invention may comprise a group of photodiodes arranged in a matrix so as to correspond to a field of view of a standard digital still camera, a plurality of vertical CCDs for transferring an output of each photodiode belonging to the photodiode group in a vertical direction in a corresponding column of the matrix, and a horizontal CCD for transferring electric charges that have been transferred from the vertical CCDs in a horizontal direction to send them out to an external circuit, the transfer actions of the vertical shift CCDs and horizontal CCD being controllable from outside.

The photodiode group which is arranged in a matrix may comprise a first subgroup consisting of photodiodes belonging to a prescribed horizontal band consisting of a number of horizontal lines that is 20% or less, or 10% or less of the total number of horizontal lines, and a second subgroup consisting of photodiodes not belonging to the prescribed horizontal band and all or most of the photodiodes forming the first subgroup excluding those located adjacent to horizontal terminal ends of the prescribed horizontal band consist of photosensitive pixels while all or most of the photodiodes forming the second subgroup consist of optically black pixels.

Preferably, the prescribed horizontal band is located adjacent to the horizontal CCD.

The prescribed horizontal band may be defined by cutting out an elongated window in a light shield mask placed over a light receiving surface of the device.

Preferably, the prescribed horizontal band corresponds to a measurement image region of a displacement sensor, 3-D sensor, length sensor or bar code reader using a light section method as a detection principle.

In the various embodiments described above, the horizontal lines of the imaging device extend in a direction along which the position of the light image changes on the light receiving surface of the imaging device with a displacement of the measurement object. However, the direction of the imaging device may be rotated by 90 degrees. In other words, the horizontal lines of the imaging device may extend in a direction perpendicular to a direction along which the position of the light image changes on the two dimensional imaging device with a displacement of the measurement object. Thus, an elongated region extending along the radiated position of the line beam can be imaged within a field of view at high speed, and the distribution of height within this elongated region can be measured all at the same time. For instance, a plurality of leads or BGA may be covered within the field of view, the variations in their heights can be measurement all at the same time.

INDUSTRIAL APPLICABILITY

As can be appreciated from the foregoing description, according to the displacement sensor of the present invention, the elongated field of view can be imaged at high speed and required resolution, and various measurement processes can be executed in highly responsive manner. The present invention additionally provides a displacement sensor that can be manufactured at low cost.

The invention claimed is:

1. A displacement sensor, comprising:
an imaging unit for imaging a surface of a measurement object having a sectional light image from such an angle as to make a position of the light image look different in dependence on a displacement of the measurement object; and
an image processing unit for computing the displacement of the measurement object by processing an image obtained from the imaging unit,
wherein the imaging unit comprises:
a two dimensional imaging device including a group of light receiving pixels arranged in a matrix having rows and columns so as to correspond to a field of view of a standard imaging unit, a plurality of vertical shift registers corresponding to different columns of the pixels, and a horizontal shift register for receiving the outputs of the vertical shift registers from top stages thereof, the light receiving pixels including a photosensitive pixel region being defined in a prescribed horizontal band having a sufficiently narrower width than that would be provided by the total number of horizontal lines, a front optically black pixel region comprising a first plurality of the rows extending in a direction parallel to the horizontal shift register, and a back optically black pixel region comprising a second plurality of the rows extending in a direction parallel to the horizontal shift register, wherein the photosensitive pixel region is interposed between the front optically black pixel region and the back optically black pixel region, and
a drive control unit for controlling, according to a commanded electric charge transfer protocol, a feeding of signal electric charges from each pixel to the vertical shift register of a corresponding column, a vertical transfer of signal electric charges in the vertical shift register of each column, and a horizontal transfer of signal electric charges in the horizontal shift register,
the image processing unit comprising electric charge transfer protocol command means for giving an electric charge transfer protocol to the drive control unit of the imaging unit in dependence of a content of the image process.

2. A displacement sensor according to claim 1, wherein the sectional light image on the surface of the measurement object is formed by a sectional light beam having a linear cross section.

3. A displacement sensor according to claim 1, wherein the prescribed horizontal band is placed adjacent to the horizontal shift register in the two dimensional imaging device.

4. A displacement sensor according to claim 1, wherein the total number of horizontal lines in the prescribed horizontal band is less than or equal to 20% of the total number of horizontal lines in the two dimensional imaging device.

5. A displacement sensor according to claim 1, wherein the two dimensional imaging device is provided with a light receiving pixel arrangement pattern which corresponds to the aspect ratio of the field of view of a common digital still camera, normal TV camera or HD TV camera.

6. A displacement sensor according to claim 1, wherein each of the optically black pixels is provided with a device structure in which a photoelectric transducer is covered by a light shield mask, a photoelectric transducer is disabled and/or an electric charge transfer path between a photoelectric transducer and the corresponding vertical shift register is cut.

7. A displacement sensor according to claim 1, wherein the horizontal lines of the two dimensional imaging device extend in a direction along which the position of the light image changes on the two dimensional imaging device in accordance with a displacement of the measurement object.

8. A displacement sensor according to claim 1, wherein the horizontal lines of the two dimensional imaging device extend in a direction perpendicular to a direction along which the position of the light image changes on the two dimensional imaging device in accordance with a displacement of the measurement object.

9. A displacement sensor according to claim 1, wherein contents of a command on the electric charge transfer protocol issuing from the image processing unit comprise a repeated execution of
a signal electric charge feeding process for feeding signal electric charges from each light receiving pixel to the vertical shift register of the corresponding column at the beginning of each vertical interval,
a front optically black pixel region handling process for transferring signal electric charges in the vertical shift register of each column fed from a front optically black pixel region to the horizontal shift register, and
a photosensitive pixel region handling process for reading signal electric charges on the vertical shift register of each column fed from the photosensitive pixel region to an external circuit by appropriately linking the transfer of the vertical shift register of each column with the transfer of the horizontal shift register,
without performing a back optically black pixel region handling process for transferring signal electric charges in the vertical shift register of each column fed from a back optically black pixel region to the horizontal shift register,
so that the time period required for reading out a single frame may be reduced by the time period saved by not performing the back optically black pixel region handling process.

10. A displacement sensor according to claim 9, wherein the front optically black pixel region handling process includes a process of repeatedly performing a plurality of stages of consecutive vertical transfer for each horizontal interval over one or a plurality of horizontal intervals.

11. A displacement sensor according to claim 10, wherein the process of performing a plurality of stages of consecutive vertical transfer for each horizontal interval is performed during the horizontal interval while the transfer of the horizontal shift register is being suspended.

12. A displacement sensor according to claim 9, wherein the photosensitive pixel region handling process comprises a process of performing one or a plurality of stages of consecutive vertical transfer and performing consecutive horizontal transfer of a number of stages corresponding to the number of pixels in each horizontal line one after the other in a time shift within a horizontal interval.

13. A displacement sensor according to claim 7, wherein contents of a command on the electric charge transfer protocol issuing from the image processing unit comprise a repeated execution of
a signal electric charge feeding process for feeding signal electric charges from each light receiving pixel to the vertical shift register of the corresponding column at the beginning of each vertical interval, a front optically black pixel region handling process for transferring signal electric charges in the vertical shift register of each column fed from a front optically black pixel region to the horizontal shift register, and a photosensitive pixel region handling process for reading signal electric charges on the vertical shift register of each column fed from the photosensitive pixel region to an external circuit by appropriately linking the transfer of the vertical shift register of each column with the transfer of the horizontal shift register, without performing a back optically black pixel region handling process for transferring signal electric charges in the vertical shift register of each column fed from a back optically black pixel region to the horizontal shift register, so that the time period required for reading out a single frame may be reduced by the time period saved by not performing the back optically black pixel region handling process, the photosensitive pixel region handling process comprising a process of performing a plurality of stages of consecutive vertical transfer and performing consecutive horizontal transfer of a number of stages corresponding to the number of pixels in each horizontal line one after the other in a time shift within a horizontal interval.

14. A displacement sensor according to claim 7, wherein contents of a command on the electric charge transfer protocol issuing from the image processing unit comprise a repeated execution of a signal electric charge feeding process for feeding signal electric charges from each light receiving pixel to the vertical shift register of the corresponding column at the beginning of each vertical interval, a front optically black pixel region handling process for transferring signal electric charges in the vertical shift register of each column fed from a front optically black pixel region to the horizontal shift register, and a photosensitive pixel region handling process for reading signal electric charges on the vertical shift register of each column fed from the photosensitive pixel region to an external circuit by appropriately linking the transfer of the vertical shift register of each column with the transfer of horizontal shift register, without performing a back optically black pixel region handling process for transferring signal electric charges in the vertical shift register of each column fed from a back optically black pixel region to the horizontal shift register, so that the time period required for reading out a single frame may be reduced by the time period saved by not performing the back optically black pixel region handling process, the photosensitive pixel region handling process comprising a process of transferring the electric charges of all the horizontal lines in the photosensitive pixel region to the horizontal shift register all at the same time, and while the horizontal transfer is suspended during one or a plurality of horizontal intervals to have the pixel electric charges of each vertical column to be superimposed one over the other, so that an entire line comprehensive averaging process for the photosensitive pixel region may be performed within the two dimensional imaging device.

15. A displacement sensor according to claim 1, wherein contents of a command on the electric charge transfer protocol issuing from the image processing unit comprise a repeated execution of a signal electric charge feeding process for feeding signal electric charges from each light receiving pixel to the vertical shift register of the corresponding column at the beginning of each vertical interval, a front optically black pixel region handling process for transferring signal electric charges in the vertical shift register of each column fed from a front optically black pixel region to the horizontal shift register at high speed, a photosensitive pixel region handling process for reading signal electric charges on the vertical shift register of each column fed from the photosensitive pixel region to an external circuit by appropriately linking the transfer of the vertical shift register of each column with the transfer of horizontal shift register, and a back optically black pixel region handling process for transferring signal electric charges in the vertical shift register of each column fed from a back optically black pixel region to the horizontal shift register at high speed, so that the time period required for reading out a single frame may be reduced by the time period saved by transferring signal electric charges in the vertical shift register of each column fed from the front and back optically black pixel regions at high speed.

16. A displacement sensor according to claim 15, wherein the front optically black pixel region handling process and/or the back optically black pixel region handling process includes a process of repeatedly performing a plurality of stages of consecutive vertical transfer for each horizontal interval over one or a plurality of horizontal images.

17. A displacement sensor according to claim 16, wherein the process of performing a plurality of stages of consecutive vertical transfer for each horizontal interval is performed during the horizontal interval while the transfer of the horizontal shift register is being suspended during the horizontal interval.

18. A displacement sensor according to claim 15, wherein the photosensitive pixel region handling process comprises a process of performing one or a plurality of stages of consecutive vertical transfer and performing consecutive horizontal transfer of a number of stages corresponding to the number of pixels in each horizontal line one after the other in a time shift within a horizontal interval.

19. A displacement sensor according to claim 7, wherein contents of a command on the electric charge transfer protocol issuing from the image processing unit comprise a repeated execution of a signal electric charge feeding process for feeding signal electric charges from each light receiving pixel to the vertical shift register of the corresponding column at the beginning of each vertical interval, a front optically black pixel region handling process for transferring signal electric charges in the vertical shift register of each column fed from a front optically black pixel region to the horizontal shift register at high speed, a photosensitive pixel region handling process for reading signal electric charges on the vertical shift register of each column fed from the photosensitive pixel region to an external circuit by appropriately linking the transfer of the vertical shift register of each column with the transfer of the horizontal shift register, and a back optically black pixel region handling process for transferring signal electric charges in the vertical shift register of each column fed from a back optically black pixel region to the horizontal shift register at high speed, so that the time period required for reading out a single frame may be reduced by the time period saved by transferring signal electric charges in the vertical shift register of each column fed from the front and back optically black pixel regions at high speed, the photosensitive pixel region handling process comprising a process of performing a plurality of stages of consecutive vertical transfer and performing consecutive horizontal transfer of a number of stages corresponding to the number of pixels in each horizontal line one after the other in a time shift within a horizontal interval.

20. A displacement sensor according to claim 7, wherein contents of a command on the electric charge transfer protocol issuing from the image processing unit comprise a repeated execution of a signal electric charge feeding process for feeding signal electric charges from each light receiving pixel to the vertical shift register of the corresponding column at the beginning of each interval, a front optically black pixel region handling process for transferring signal electric charges in the vertical shift register of each column fed from a front optically black pixel region to the horizontal shift register at high speed, a photosensitive pixel region handling process for reading signal electric charges on the vertical shift register of each column fed from the photosensitive pixel region to an external circuit by appropriately linking the transfer of the vertical shift register of each column with the transfer of horizontal shift register, and a back optically black pixel region handling process for transferring signal electric charges in the vertical shift register of each column fed from a back optically black pixel region to the horizontal shift register at high speed, so that the time period required for reading out a single frame may be reduced by the time period saved by transferring signal electric charges in the vertical shift register of each column fed from the front and back optically black pixel regions to the horizontal shift register at high speed, the photosensitive pixel region handling process comprising a process of transferring the electric charges of all the horizontal lines in the photosensitive pixel region to the horizontal shift register all at the same time, while the horizontal transfer is suspended during one or a plurality of horizontal intervals, to have the pixel electric charges of each vertical column to be superimposed one over the other, so that an entire line comprehensive averaging process for the photosensitive pixel region may be performed within the two dimensional imaging device.

21. A displacement sensor according to claim 1, wherein the contents of the image processing that is performed in the image processing unit comprise the action of computing the height of each measurement line and finding a peak to peak distance or a variance so that a flaw is measured.

22. A displacement sensor according to claim 1, wherein the contents of the image processing that is performed in the image processing unit comprise the action of computing the height of each measurement line and finding a peak so that a projection is measured.

23. A displacement sensor according to claim 1, wherein the contents of the image processing that is performed in the image processing unit comprise the action of computing the height of each measurement line and finding a bottom so that a groove is measured.

24. A displacement sensor according to claim 1, wherein the contents of the image processing that is performed in the image processing unit comprise the action of computing the height of each measurement line and finding an inclination so that an inclination is measured.

25. A displacement sensor according to claim 1, wherein the contents of the image processing that is performed in the image processing unit comprise the action of computing the height of each measurement line and finding a time average of the heights so that a coplanarity is measured by a relative movement of the sensor and a work.

26. A displacement sensor, comprising:

an imaging unit for imaging a surface of a measurement object having a sectional light image from such an angle as to make a position of the light image look different in dependence on a displacement of the measurement object; and an image processing unit for computing the displacement of the measurement object by processing an image obtained from the imaging unit, wherein the imaging unit comprises:

a two dimensional imaging device including a group of light receiving pixels arranged in a matrix in rows and columns so as to correspond to a field of view of a standard imaging unit, a plurality of vertical shift registers corresponding to different columns of the pixels, and a horizontal register for receiving the outputs of the vertical shift registers from top stages thereof, the light receiving pixels including a photosensitive pixel region being defined in a prescribed horizontal band having a sufficiently narrower width than that would be provided by the total number of horizontal lines, a front optically black pixel region comprising a first plurality of the rows extending in a direction parallel to the horizontal shift register, and a back optically black pixel region comprising a second plurality of the rows extending in a direction parallel to the horizontal shift register, wherein the photosensitive pixel region is interposed between the front optically black pixel region and the back optically black pixel region, and a drive control unit for controlling, according to a commanded electric charge transfer protocol, a feeding of signal electric charges from each group of light receiving pixels to the vertical shift register of a corresponding column, a vertical transfer of signal electric charges in the vertical shift register of each column, and a horizontal transfer of signal electric charges in the horizontal shift register, the image processing unit being adapted to perform an image processing based on a same electric charge transfer protocol as that used by the drive control unit of the imaging unit.

* * * * *